United States Patent
Fuji et al.

(10) Patent No.: US 9,493,361 B2
(45) Date of Patent: Nov. 15, 2016

(54) SKELETON NANOPARTICLES AND METHOD FOR MANUFACTURING THE SAME

(75) Inventors: Masayoshi Fuji, Nagoya (JP); Kyoichi Fujimoto, Seki (JP); Chika Takai, Seki (JP)

(73) Assignees: NAGOYA INSTITUTE OF TECHNOLOGY, Nagoya-shi, Aichi (JP); GRANDEX Co., Ltd., Seki-shi, Gifu (JP)

(*) Notice: Subject to any disclaimer, the term of this patent is extended or adjusted under 35 U.S.C. 154(b) by 247 days.

(21) Appl. No.: 14/007,490

(22) PCT Filed: Mar. 2, 2012

(86) PCT No.: PCT/JP2012/055330
§ 371 (c)(1),
(2), (4) Date: Sep. 25, 2013

(87) PCT Pub. No.: WO2012/132757
PCT Pub. Date: Apr. 20, 2012

(65) Prior Publication Data
US 2014/0017496 A1    Jan. 16, 2014

(30) Foreign Application Priority Data
Mar. 30, 2011    (JP) .................. 2011-076062

(51) Int. Cl.
*B05D 3/10* (2006.01)
*B05D 7/00* (2006.01)
(Continued)

(52) U.S. Cl.
CPC .............. *C01B 33/18* (2013.01); *C01B 33/12* (2013.01); *C01B 33/182* (2013.01); *C08K 7/26* (2013.01); *Y10T 428/2982* (2015.01); *Y10T 428/2991* (2015.01)

(58) Field of Classification Search
CPC ....... C01B 33/12; C01B 33/281; C08K 7/26; C01P 2004/38; C01P 2004/90; Y10T 428/2991

USPC .............. 428/402–404; 427/212, 13.31, 215, 427/219, 331
See application file for complete search history.

(56) References Cited

U.S. PATENT DOCUMENTS 6,342,100 B1 * 1/2002 Nover et al. .................. 106/464
7,485,367 B2 * 2/2009 Chen .................... C01F 11/185
427/215
(Continued)

FOREIGN PATENT DOCUMENTS

JP    2005-263550 A    9/2005
JP    2009-107857 A    5/2009
(Continued)

OTHER PUBLICATIONS

Machine translation JP 2010-215490 (2010).*
(Continued)

*Primary Examiner* — Holly Le
(74) *Attorney, Agent, or Firm* — Sughrue Mion, PLLC; Richard C Turner

(57) ABSTRACT

Skeleton nanoparticles and method of forming the same. The skeleton nanoparticles comprise silica shells. Each of the silica shells has a shape of a cubic frame formed of six faces as a whole. The cubic frame is hollow inside and pores are formed between quadrilateral silica frames on respective faces of the cubic frame. The method comprising: coating an organic acid on surfaces of calcium carbonate particles; dispersing the organic acid-coated calcium carbonate particles in an organic solvent that dissolves a part of the organic acid in the organic acid-coated calcium carbonate particles, and further mixing a silicon alkoxide and a base catalyst to form silica-forming particles by forming the silica shell along an edge of the calcium carbonate particles; and dissolving the calcium carbonate at an inside of the silica-forming particles by an acid treatment.

14 Claims, 20 Drawing Sheets

(51) Int. Cl.
*B01J 20/10* (2006.01)
*B01J 21/12* (2006.01)
*B32B 5/16* (2006.01)
*C01B 33/18* (2006.01)
*C08K 7/26* (2006.01)
*C01B 33/12* (2006.01)

(56) References Cited

U.S. PATENT DOCUMENTS

| | | | |
|---|---|---|---|
| 2005/0170178 A1* | 8/2005 | Chen | C01F 11/185 428/402 |
| 2008/0220255 A1* | 9/2008 | Chen | C01F 11/185 428/404 |
| 2010/0041809 A1* | 2/2010 | Cavalier et al. | 524/424 |
| 2011/0197787 A1* | 8/2011 | Kawai | B82Y 30/00 106/287.1 |
| 2014/0287236 A1* | 9/2014 | Fuji | C01B 33/24 428/402 |

FOREIGN PATENT DOCUMENTS

| | | |
|---|---|---|
| JP | 2009-234854 A | 10/2009 |
| JP | 2010-105840 A | 5/2010 |
| JP | 2010-131592 A | 6/2010 |
| JP | 2010-215490 A | 9/2010 |
| JP | 2010-222147 A | 10/2010 |

OTHER PUBLICATIONS

Yang et al., Preparation of three dimensional porous silicon with fluoride-free method and its application in lithium ion batteries, ECS Solid State Lett., 2 (11) M53-M56 (2013).*

* cited by examiner

F I G. 6 A
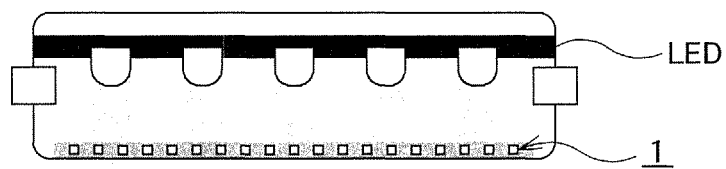
F I G. 6 B
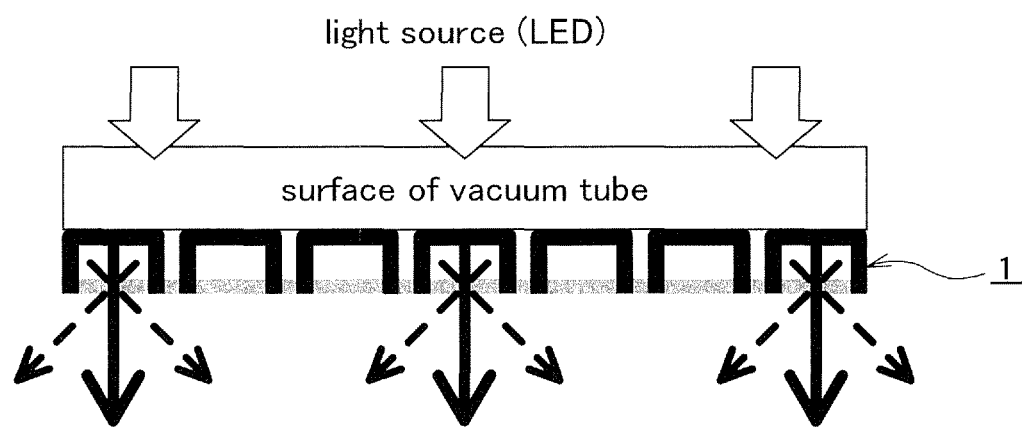

F I G. 7
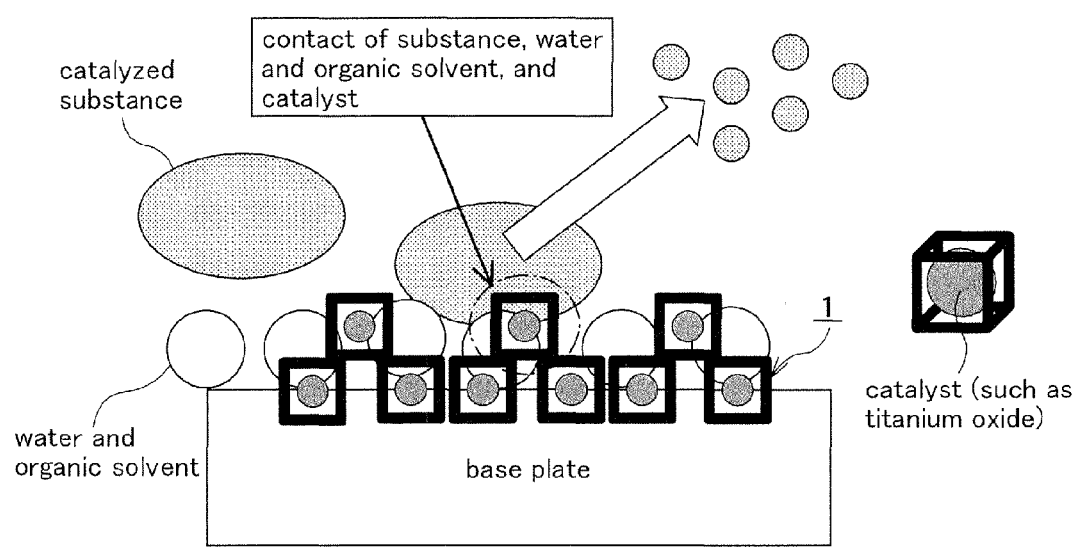

F I G. 9
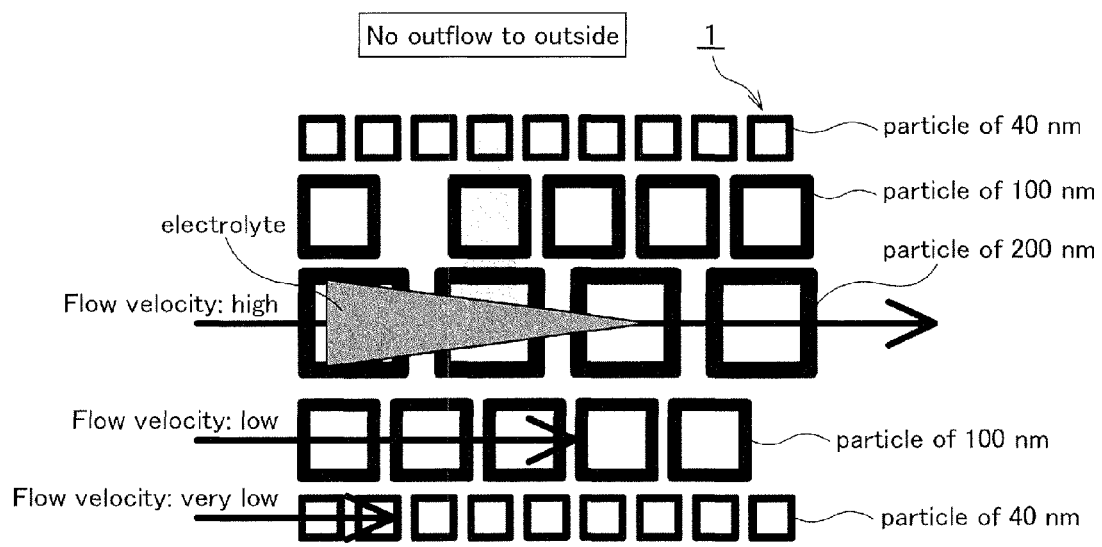
F I G. 1 0
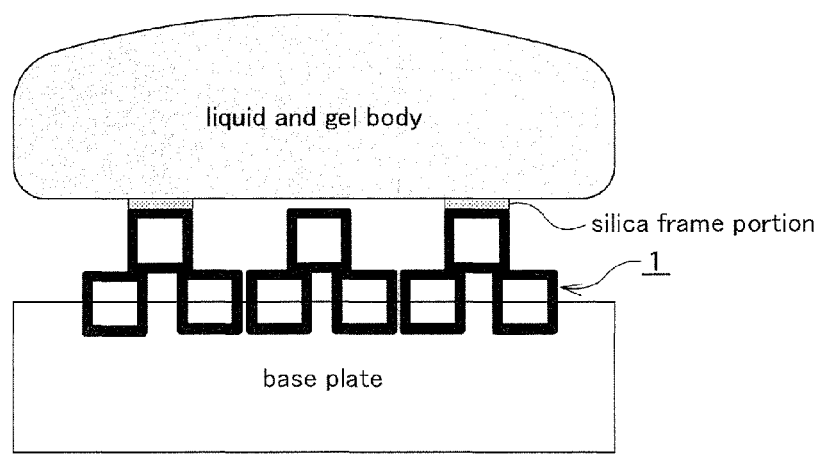

F I G. 1 1
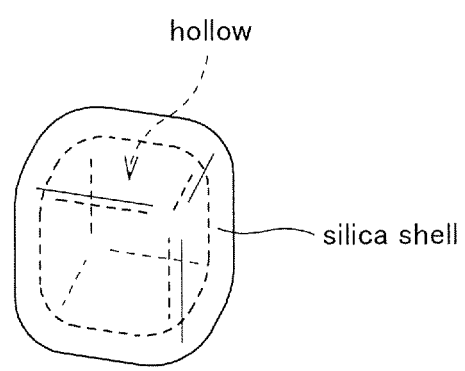

Reaction time: 15 min. (Comparative Example 3)

Reaction time: 30 min. (Comparative Example 4)

Reaction time: 60 min. (Example 8)

Reaction time: 90 min. (Example 9)

F I G. 1 4 E  Reaction time: 120 min. (Example 10)
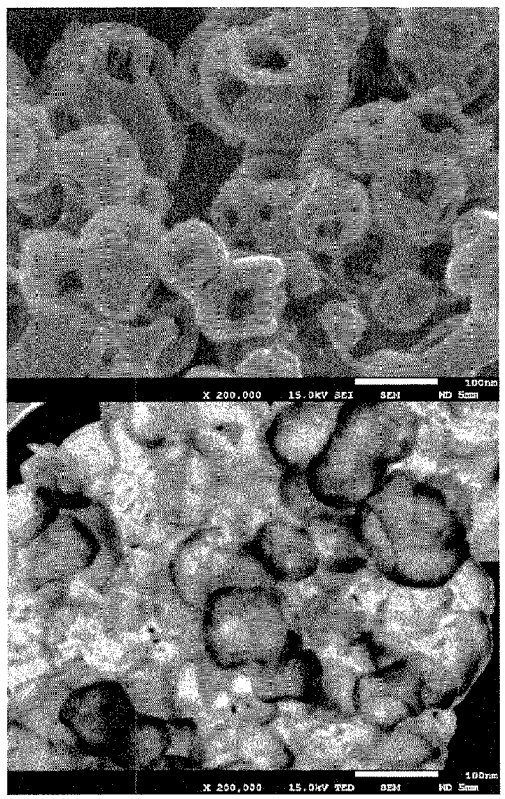
F I G. 1 4 F  Reaction time: 240 min. (Example 11)
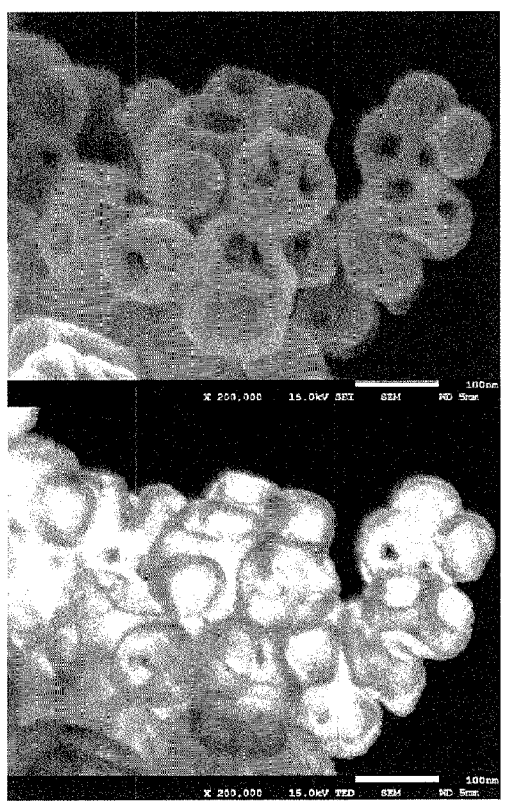

Organic solvent: ethanol (Example 12)

Organic solvent: 1-propanol (Example 13)

F I G. 1 6 C  Organic solvent: 2-propanol (Example 14)
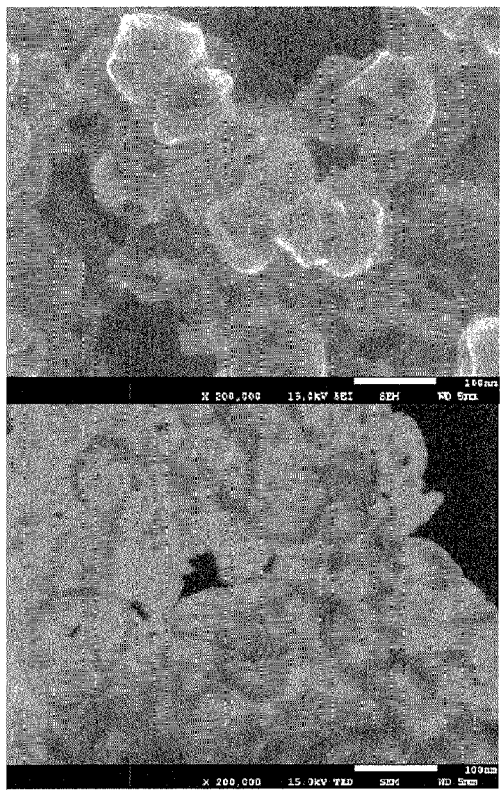
F I G. 1 6 D  Organic solvent: 1-butanol (Example 15)
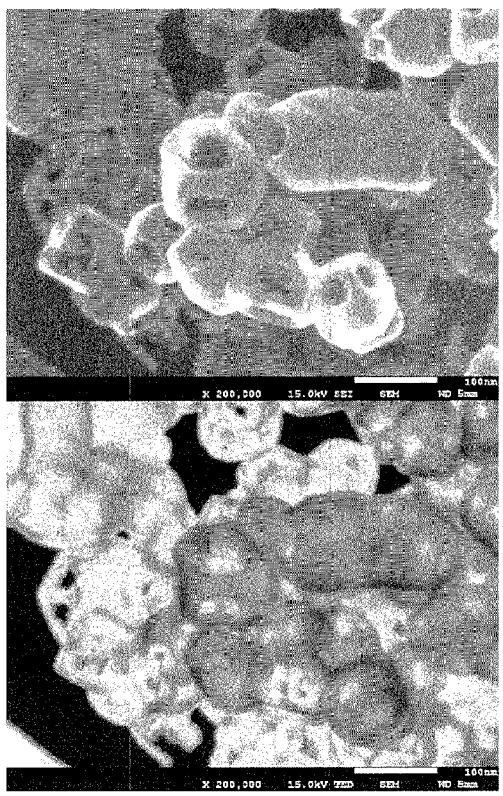

F I G. 1 7 A  Organic solvent: methanol (Comparative Example 5)
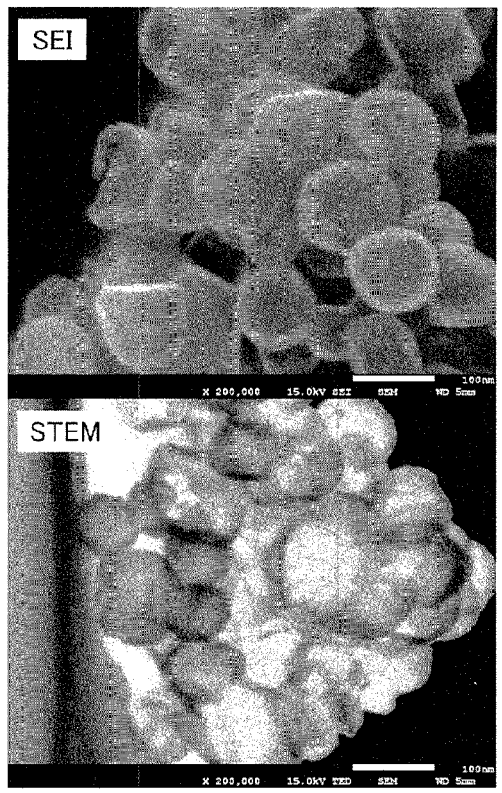
F I G. 1 7 B  Organic solvent: octanol (Comparative Example 6)
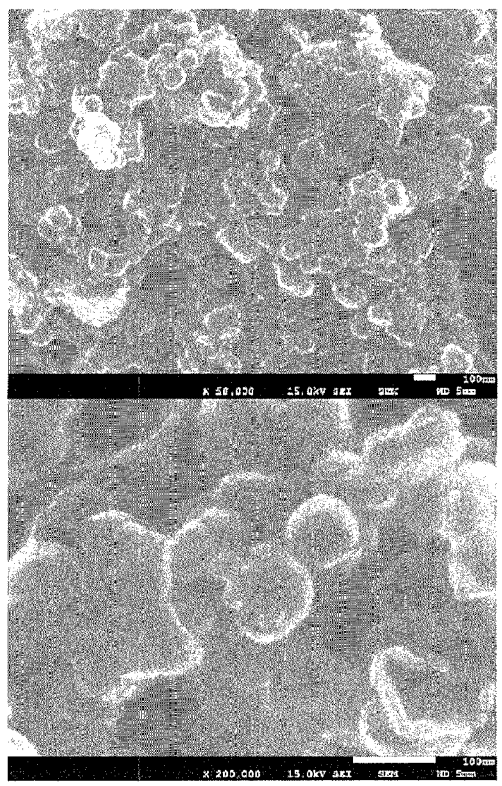

F I G. 1 8 A  Organic solvent: methyl ethyl ketone (Example 16)
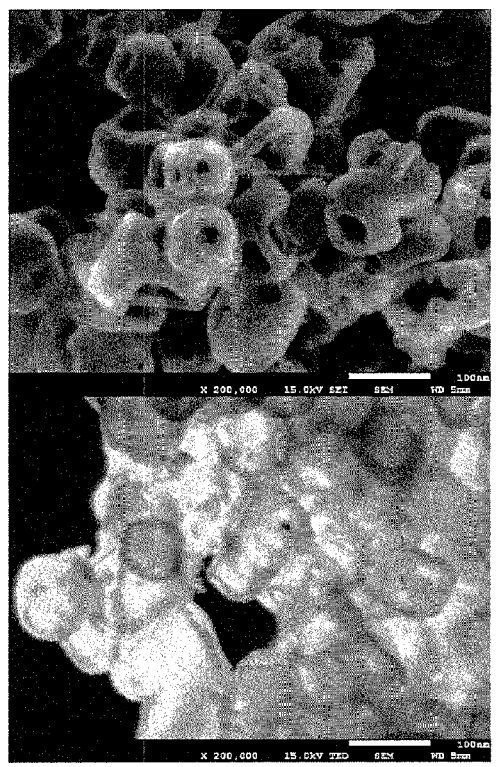
F I G. 1 8 B  Organic solvent: acetone (Comparative Example 7)
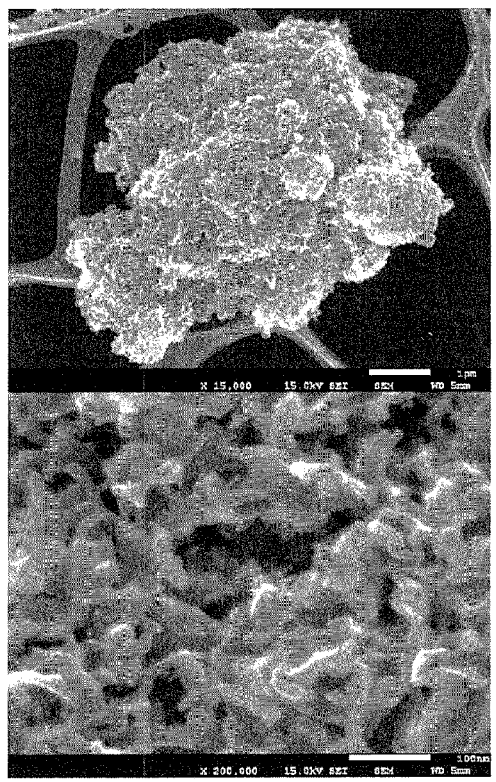

Organic solvent: dioxane (Example 17)

F I G. 2 0
Organic solvent: diethylene glycol (Comparative Example 9)
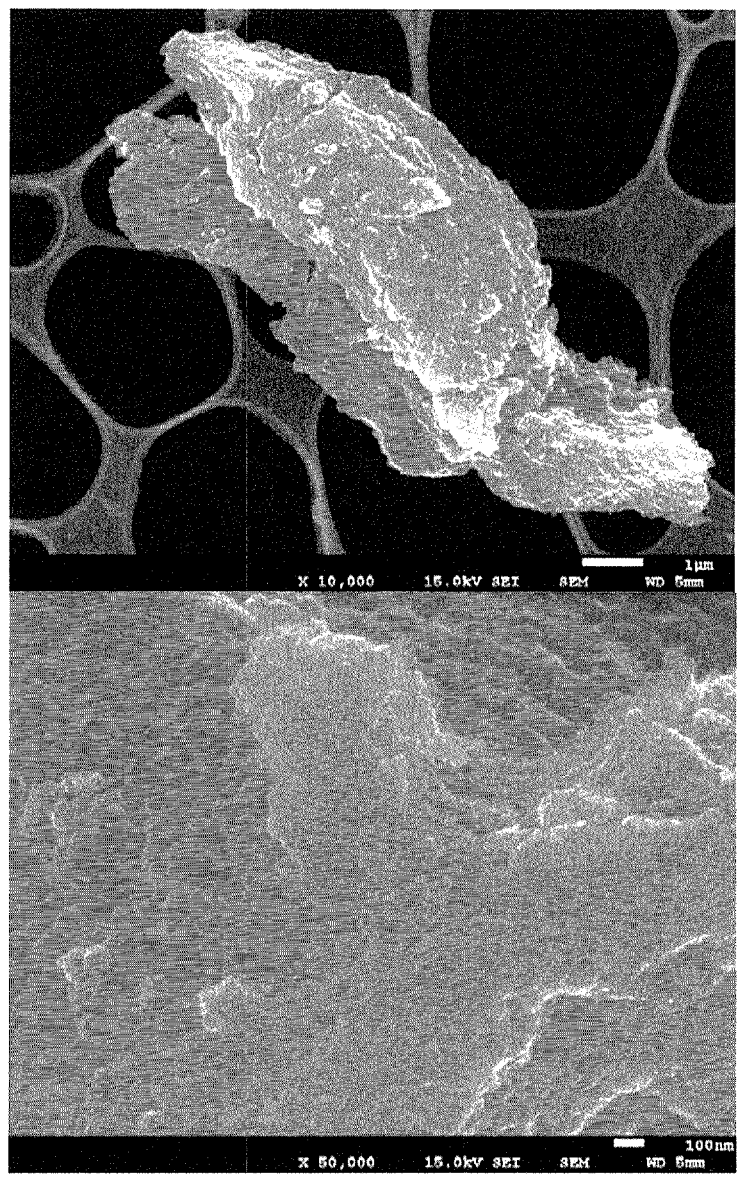

F I G. 2 1
| Organic solvent | ethanol (Example 12) | 1-propanol (Example 13) | 1-butanol (Example 15) |
|---|---|---|---|
| Polarity | 24.55 | 20.45 | 17.51 |
| | ① 9.46%, ② 9.46%, ③ 19.14% | ① 30.25%, ② 56.25%, ③ 36.0%, ④ 27.56%, ⑤ 32.6% | ① 34.02%, ② 29.75%, ③ 41.32%, ④ 19.75%, ⑤ 18.36%, ⑥ 12.75%, ⑦ 9.47% |
| Pore ratio (%) *1 | 9% to 19% | 27% to 56% | 9% to 41% |
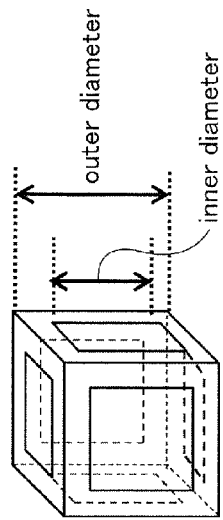
*1 proportion of pore (%) = (inner diameter)$^2$ / (outer diameter)$^2$ × 100

SKELETON NANOPARTICLES AND METHOD FOR MANUFACTURING THE SAME

CROSS REFERENCE TO RELATED APPLICATIONS

This application is a National Stage of International Application No. PCT/JP2012/055330 filed Mar. 20, 2012, claiming priority based on Japanese Patent Application No. 2011-076062 filed Mar. 30, 2011, the contents of all of which are incorporated herein by reference in their entirety.

TECHNICAL FIELD

The present invention relates to skeleton nanoparticles that have an outer diameter ranging from 30 nm to 300 nm and that comprise a silica shell and a method for manufacturing the same, and more particularly to skeleton nanoparticles that can be used for various purposes and a method for manufacturing the same.

BACKGROUND ART

In recent years, as part of a study of nanotechnology, an application study on particles having a particle diameter of several hundred nanometers or less has been actively conducted. In particular, hollow particles wherein silica or the like is used are also expected to have nano-sized one to deal with a trend of ultrafine technology that is typified by the nanotechnology. The hollow particles are hollow inside. Thus, for example, studies to utilize them as a sustained-release drug or a sustained-release cosmetic containing an active ingredient, as one for protecting a substance that is decomposed or deteriorated by contact with an outside environment, as a carrier for a drug delivery system or the like have been conducted. They are expected to be applied in various fields.

As an example of the hollow particles made by using the silica, there is an invention on highly dispersed hollow silica nanoparticles and a method for manufacturing the same described in a patent document 1. According to a description of the patent document 1, the hollow nanoparticles are hollow nanoparticles that comprise a dense silica shell and that have a primary particle diameter by a transmission electron microscopic method of 30 to 300 nm and a particle diameter by a static light scattering method of 30 to 800 nm, wherein pores of 2 nm to 20 nm are not detected in a pore distribution measured by a mercury intrusion method.

PRIOR ART DOCUMENT(S)

Patent Document(s)

PATENT DOCUMENT 1: Laid Open (Kokai) Patent Publication No. 2005-263550

SUMMARY OF THE INVENTION

Problems that the Invention is to Solve

Here, the invention described in the patent document 1 describes Example 1 wherein a silica shell having a thickness of 5 to 10 nm was found on a surface of calcium carbonate. Thus, it is assumed that an entire surface of the calcium carbonate is coated with the silica shell, and particles made by dissolving the calcium carbonate have a shape wherein a shape of the calcium carbonate is transcribed thereinto and it is surrounded by faces of the silica shell. Consequently, it is inferred that for example, in case the calcium carbonate is in the form of a cube, obtained hollow particles are in the form of the cube and have all of surfaces thereof formed of the silica shell as shown in FIG. 11.

However, although the silica nanoparticles in the form of the cube have a cavity (which is hollow) formed at an inner portion thereof, all of the surfaces in the form of the cube are formed of the silica shell and the cavity is surrounded by the silica shell. Thus, it is not easy to introduce an active ingredient or the like into the inner portion (hollow portion) or to release an included ingredient. In addition, the hollow particles have all of the surfaces thereof formed of the dense silica shell, thereby having high passage resistance of fluid or the like. Thus, for example, they are not suitable for an application as a catalyst carrier utilizing a hollow structure or the like. Consequently, there is a limit to expand their application range and further establishment of manufacturing hollow particles in a different form is desired in order to expand their application field.

Thus, the present invention attempts to solve such problems. It is an object of the present invention to provide skeleton nanoparticles that can further expand an application field of nanoparticles comprising a silica shell and that can be used for various purposes and a method for manufacturing the same.

Means for Solving the Problem

Skeleton nanoparticles according to an exemplary embodiment of the present invention are nanoparticles that have an outer diameter ranging from 30 nm to 300 nm and that comprise a silica shell. The silica shell has a shape of a cubic frame formed of six faces as a whole. The cubic frame is hollow inside and quadrilateral silica frames on respective faces of the cubic frame have pores formed therebetween.

Here, the "skeleton nanoparticles" means the ones in which the cubic frame, which is formed of the silica shell and has the shape of the cubic frame, is hollow inside.

In addition, the "shape of the cubic frame" is not limited to the shape in which the frame is a cubic shape. It includes a shape that is substantially constituted of six quadrilaterals and to be similar to the cube, too. More specifically, the shape of the cubic frame formed of the six faces as a whole does not necessarily mean a cubic frame formed of a regular hexahedron. It means a cubic frame shape and it does not make an issue of any part other than a silhouette line of a hexahedron.

In addition, "have an outer diameter ranging from 30 nm to 300 nm" means that a primary particle diameter measured by a microscopic method is within a range of 30 nm to 300 nm in the specification and the claims. The microscopic method as is defined here is a method in which particles are actually observed using a scanning electron microscope (SEM) or a transmission electron microscope (TEM) to find a size of each part of the particles. The above numeric values are not obtained as a critical value or a boundary value and the numeric values are regarded as an approximate value.

In skeleton nanoparticles according to the invention of claim 2, a proportion of each of the pores is within a range of 3% to 94% in terms of a surface area of each of the faces of the cubic frame, more preferably within a range of 10% to 87%.

In skeleton nanoparticles according to an exemplary embodiment of the present invention, a width of the silica frame is within a range of 5 nm to 115 nm, more preferably within a range of 10 nm to 100 nm.

In skeleton nanoparticles according to an exemplary embodiment of the present invention, the skeleton nanoparticles are made by: dispersing dry powdered organic acid-coated calcium carbonate particles, which are made by coating surfaces of calcium carbonate particles that have a predetermined sized outer diameter and that are in the form of a cube and in a dry powder state with an organic acid, in an organic solvent that can dissolve a part of the organic acid in the organic acid-coated calcium carbonate particles; further mixing a silicon alkoxide and a base catalyst to form silica-forming particles with a silica shell formed along an edge of the calcium carbonate particles; and then dissolving the calcium carbonate in the silica-forming particles by an acid treatment.

Here, "the form of a cube" is not limited to the cube. It means a form that is surrounded by six faces of a substantially quadrilateral shape and similar to the cube.

In addition, as the "organic acid", one that can coat the dry powdered calcium carbonate particles may be adopted. It includes, for example, alkaline soap of a rosin acid or a fact acid, etc. or the like.

As the "organic solvent", one that can dissolve the part of the organic acid in the organic acid-coated calcium carbonate particles and that has solubility in the silicon alkoxide and water may be adopted. It includes a solvent that has low solubility in the organic acid and that has low interactivity (affinity and reactivity) with the calcium carbonate particles or the silicon alkoxide, for example, an alcohol series such as ethanol, propanol, and butanol, a ketone series such as methyl ethyl ketone, an ether series such as dioxane or the like. Such solvent may be one kind or a mixture of two kinds or more.

Moreover, as the "silicon alkoxide", one that can precipitate silica by hydrolysis thereof may be adopted. For example, tetraethoxysilane (TEOS), trimethoxysilane, tetramethoxysilane, triethoxysilane, tripropoxysilane, tetrapropoxysilane, tributoxysilane or the like may be used.

In addition, the "base catalyst" includes, for example, ammonia, amines or the like.

In skeleton nanoparticles according to an exemplary embodiment of the present invention, the organic acid is a rosin acid.

In skeleton nanoparticles according to an exemplary embodiment of the present invention, the organic solvent is at least one kind selected from an alcohol series, a ketone series, and an ether series.

The "alcohol series" includes ethanol, propanol, butanol or the like, the "ketone series" includes methyl ethyl ketone or the like, and the "ether series" includes dioxane or the like.

In skeleton nanoparticles according to an exemplary embodiment of the present invention, the skeleton nanoparticles are made by further mixing a silicon oil, preferably a modified silicon oil, more preferably a monoamine ($NH_2$)-modified silicon oil with the solvent.

In skeleton nanoparticles according to an exemplary embodiment of the present invention, an ultrasonic treatment was conducted in a process of forming the silica shell on the surfaces of the calcium carbonate particles.

A method for manufacturing skeleton nanoparticles according embodiment of the present invention is a method for manufacturing nanoparticles in which they have an outer diameter ranging from 30 nm to 300 nm and comprise a silica shell having a shape of a cubic frame, wherein the cubic frame is hollow inside and quadrilateral silica frames on respective faces of the cubic frame have pores formed therebetween.

The method for manufacturing the skeleton nanoparticles comprises: an organic acid-coated calcium carbonate formation step in which surfaces of calcium carbonate particles that have a predetermined sized outer diameter and that are in the form of a cube and in a dry powder state, are coated with an organic acid to form organic acid-coated calcium carbonate particles; a silica formation step in which the organic acid-coated calcium carbonate particles are dispersed in an organic solvent that dissolves a part of the organic acid in the organic acid-coated calcium carbonate particles, and a silicon alkoxide and a base catalyst are further mixed to form silica-forming particles with the silica shell formed along an edge of the calcium carbonate particles; and a calcium carbonate dissolution step in which the calcium carbonate is dissolved in the silica-forming particles by an acid treatment.

In a method for manufacturing skeleton nanoparticles according to an exemplary embodiment of the present invention, a proportion of each of the pores is within a range of 3% to 94% in terms of a surface area of each of the faces of the cubic frame, more preferably within a range of 10% to 87%.

In a method for manufacturing skeleton nanoparticles according to embodiment of the present invention, a width of the silica frame is within a range of 5 nm to 115 nm, more preferably within a range of 10 nm to 100 nm.

In a method for manufacturing skeleton nanoparticles according to an exemplary embodiment of the present invention, the organic acid is a rosin acid.

In a method for manufacturing skeleton nanoparticles according to an exemplary embodiment of the present invention, the organic solvent is at least one kind selected from an alcohol series, a ketone series, and an ether series.

In a method for manufacturing skeleton nanoparticles according to an exemplary embodiment of the present invention, a silicon oil, preferably a modified silicon oil, more preferably a monoamine ($NH_2$)-modified silicon oil is further mixed with the medium.

In a method for manufacturing skeleton nanoparticles according to an exemplary embodiment of the present invention, an ultrasonic treatment was conducted in the silica formation step.

Effects of the Invention

The skeleton nanoparticles according to the invention of claim 1 comprise the silica shell that has the shape of the cubic frame. The cubic frame is hollow inside and the quadrilateral silica frames on the respective faces of the cubic frame have the pores formed therebetween. Thus, it is possible to easily insert a substance such as an active ingredient into the cavity through the pores and it is possible to easily release the included substance, too. Moreover, the skeleton nanoparticles have an extremely small outer diameter that is within the range of 30 nm to 300 nm. Consequently, it is easy to utilize the skeleton nanoparticles, for example, as a delivery system and it is possible to expand their application range.

In addition, the skeleton nanoparticles are thus hollow inside and have a cubic frame structure and the pores between the silica frames. Thus, they easily transmit liquid, gas or the like and have low passage resistance. Also, the substance included through the pores can contact with an external substance. Consequently, they can be used in an application as a catalyst carrier. Moreover, it is possible to selectively pass fluid or the like by the pores. Thus, they can be used as a filter or an electrolyte holder, too. In addition, they can also transmit light (light permeability), and a part of light that entered through the pores can be refracted and scattered by the silica frame (light diffusivity), too. Thus, they can be applied to lightning such as LED to increase luminous efficiency, too.

Besides, with aggregability of the skeleton nanoparticles, it is possible to form irregularity when the skeleton nanoparticles are applied on a base plate. Here, only a silica frame portion of the skeleton nanoparticles is contacted with a substance that approaches an upper side of the base plate, since the skeleton nanoparticles have the cubic frame structure. Thus, a contact area can be reduced. Thereby, they can be applied as a super-hydrophobic membrane and a super-hydrophilic membrane, too.

Thus, there are provided skeleton nanoparticles that can further expand the application field of the nanoparticles comprising the silica shell and that can be used for various purposes.

In the skeleton nanoparticles according to the invention of claim 2, the proportion of each of the pores is within the range of 3% to 94% in terms of the surface area of each of the faces of the cubic frame. Thus, it is possible to more easily insert and release substances of various sizes such as an active ingredient. In addition, it is easy to contact with an external substance and transmit liquid, gas or the like. Thus, in addition to the effects of claim 1, the skeleton nanoparticles are easily used for various purposes.

In the skeleton nanoparticles according to the invention of claim 3, the width of the silica frame is within the range of 5 nm to 115 nm. Thus, they are not easily broken by an outside environment and have high transparency. Accordingly, in addition to the effects of one of claim 1 or claim 2, the skeleton nanoparticles can be adopted for an application that requires high strength of the silica shell or a high degree of transparency, too.

In the skeleton nanoparticles according to the invention of claim 4, the skeleton nanoparticles are made by: dispersing the dry powdered organic acid-coated calcium carbonate particles, which are made by coating the surfaces of the calcium carbonate particles that are in the form of the cube and in the dry powder state with the organic acid, in the organic solvent that can dissolve the part of the organic acid in the organic acid-coated calcium carbonate particles; further mixing the silicon alkoxide and the base catalyst to form the silica-forming particles with the silica shell formed along the edge of the calcium carbonate particles; and then dissolving the calcium carbonate in the silica-forming particles by the acid treatment.

Here, when the dry powdered organic acid-coated calcium carbonate particles are dispersed in the organic solvent, the organic acid in the edge portion of the organic acid-coated calcium carbonate particles in the form of the cube is dissolved (the part of the organic acid is dissolved). Moreover, when the silicon alkoxide and the base catalyst are further mixed, $SiO_2$ molecules produced by hydrolysis and polycondensation of the silicon alkoxide form the silica shell along the edge, which came out by dissolving the organic acid, of the calcium carbonate particles in the form of the cube to form the silica-forming particles. Finally, the calcium carbonate in the silica-forming particles is dissolved by the acid treatment, and the skeleton nanoparticles that have the outer diameter ranging from 30 nm to 300 nm are formed.

The skeleton nanoparticles are made by forming the silica shell along the edge of the calcium carbonate particles in the form of the cube. Thus, the silica shell has the shape of the cubic frame, and the pores are formed between the quadrilateral silica frames on the respective faces of the cubic frame. In addition, the skeleton nanoparticles are made by dissolving the calcium carbonate after forming the silica shell. Thus, the cubic frame is hollow inside.

As described above, the skeleton nanoparticles according to the present invention used the dry powdered organic acid-coated calcium carbonate particles made by coating the surfaces of the calcium carbonate particles in the dry powder state with the organic acid. More specifically, the surfaces of the calcium carbonate particles as core particles are coated with the organic acid. Thus, a situation where the calcium carbonate particles as the core particles mutually aggregate by absorbing the water in a process of coating with the silica shell is prevented. Consequently, skeleton nanoparticles, which are obtained by dissolving the calcium carbonate in the silica-forming particles whose aggregation is prevented, have less aggregation and have a high dispersibility.

In addition, when the dry powdered organic acid-coated calcium carbonate particles made by coating the surfaces of the calcium carbonate particles in the dry powder state with the organic acid are used, property change of raw materials is unlikely to occur. Thus, quality control is inexpensive and it is possible to achieve cost reduction. Thereby, it is possible to improve mass productivity.

Accordingly, in addition to the effects of one of claim 1 to claim 3, there are provided skeleton nanoparticles that can achieve the cost reduction and improve production efficiency and that have less aggregation into secondary particles and a high dispersibility.

In the skeleton nanoparticles according to the invention of claim 5, the organic acid is the rosin acid. Thus, it is possible to surely coat the dry powdered calcium carbonate particles and prevent aggregation of the core particles with each other. Accordingly, in addition to the effects of claim 4, it is possible to surely provide skeleton nanoparticles that have less aggregation into secondary particles and that have a high dispersibility.

In the skeleton nanoparticles comprising the silica shell according to the invention of claim 6, the organic solvent is at least the one kind selected from the alcohol series, the ketone series, and the ether series, thereby surely dissolving the part of the organic acid. However, it has low solubility in the organic acid and has weak interactivity (affinity and reactivity) with the calcium carbonate particles and the silicon alkoxide. Consequently, the silica shell produced by the hydrolysis of the silicon alkoxide is easily adsorbed to only the edge portion, which came out by dissolving the organic acid, of the calcium carbonate. In addition, the alcohol series solvent, the ketone series solvent, and the ether series solvent are easily available and relatively cheap. Accordingly, in addition to the effects of one of claim 4 or claim 5, it is possible to increase reaction efficiency and improve production efficiency. In addition, it is possible to achieve cost reduction, too.

In the skeleton nanoparticles according to the invention of claim 7, the skeleton nanoparticles are made by further mixing the silicon oil with the medium. Thus, surfaces of the silica-forming particles are protected by the silicon oil and adsorption of the silica shell on the surfaces of the calcium carbonate particles is stabilized. Accordingly, in addition to the effects of one of claim 4 to claim 6, it is possible to increase reaction efficiency and improve production efficiency. In addition, aggregation of the silica-forming particles is prevented in a reaction solution for forming the silica shell, since the surfaces of the silica-forming particles are protected. Moreover, the nanoparticles comprising the silica shell, which are obtained by dissolving the calcium carbonate, are also prevented from aggregating, since their surfaces are protected by the silicon oil. Thus, there are provided skeleton nanoparticles that have still less aggregation into secondary particles and that have a higher dispersibility.

The amino-modified silicon oil is more preferable. The amino-modified silicon oil has high reactivity with the surfaces of the silica-forming particles. Thus, the skeleton nanoparticles made by mixing with the amino-modified silicon oil have a high recovery percentage and have a low particle size distribution.

In the skeleton nanoparticles according to the invention of claim 8, the ultrasonic treatment was conducted in the process of forming the silica-forming particles. Thus, the organic acid-coated calcium carbonate particles are easily dispersed and mutual aggregation thereof is prevented. Also, the silica-forming particles wherein the silica shell is formed in a state where the particles are dispersed are prevented from mutually aggregating. Accordingly, in addition to the effects of one of claim 4 to claim 7, there are provided skeleton nanoparticles that have still less aggregation into secondary particles and that have a higher dispersibility. In addition, the silica shell is easily adsorbed on the surface of the calcium carbonate by the ultrasonic wave. Thus, it is possible to further increase reaction efficiency and improve production efficiency.

In the method for manufacturing the skeleton nanoparticles according to the invention of claim 9, the surfaces of the calcium carbonate particles that are in the form of the cube and in the dry powder state are coated with the organic acid to form the dry powdered organic acid-coated calcium carbonate particles in the organic acid-coated calcium carbonate formation step. Subsequently, the organic acid-coated calcium carbonate particles are dispersed in the organic solvent that dissolves the part of the organic acid in the organic acid-coated calcium carbonate particles, and the silicon alkoxide and the base catalyst are further mixed to form the silica-forming particles with the silica shell formed along the edge of the calcium carbonate particles in the silica formation step. After that, the calcium carbonate in the silica-forming particles is dissolved by the acid treatment in the calcium carbonate dissolution step. Thus, the skeleton nanoparticles are formed.

Here, when the dry powdered organic acid-coated calcium carbonate particles prepared in the organic acid-coated calcium carbonate formation step are dispersed in the organic solvent, the organic acid in the edge portion of the organic acid-coated calcium carbonate particles in the form of the cube is dissolved (the part of the organic acid is dissolved). Moreover, when the silicon alkoxide and the base catalyst are further mixed, the $SiO_2$ molecules produced by the hydrolysis and the polycondensation of the silicon alkoxide form the silica shell along the edge, which came out by dissolving the organic acid, of the calcium carbonate particles in the form of the cube, thereby to form the silica-forming particles. After that, the silica-forming particles are subjected to the acid treatment. Thereby, the internal calcium carbonate is dissolved in the calcium carbonate dissolution step. Thus, there are provided skeleton nanoparticles that have an outer diameter ranging from 30 nm to 300 nm.

In addition, as described above, in the method for manufacturing the skeleton nanoparticles according to the present invention, the silica shell is formed along the edge of the calcium carbonate particles in the form of the cube, and the calcium carbonate is dissolved after forming the silica shell. Thus, it is possible to obtain skeleton nanoparticles that comprise a silica shell having a shape of a cubic frame wherein the cubic frame is hollow inside and quadrilateral silica frames on each of faces of the cubic frame have pores therebetween.

In the skeleton nanoparticles thus obtained, it is possible to easily insert a substance such as an active ingredient into a cavity through the pores, and it is possible to easily release an included substance, too. Moreover, the skeleton nanoparticles have an extremely small outer diameter that is within a range of 30 nm to 300 nm. Consequently, it is easy to utilize them, for example, as a delivery system and it is possible to expand their application range.

In addition, they have a cubic frame structure with such hollow inner portion and have the pores between the silica frames. Thus, they easily transmit liquid, gas or the like and have low passage resistance. Also, the substance included through the pores can contact with an external substance, too. Thus, they can be used in an application as a catalyst carrier. Moreover, it is possible to selectively pass fluid or the like by the pores. Thus, they can be used as a filter or an electrolyte holder, too. In addition, it is also possible to transmit light (optical transparency), and a part of light that entered through the pores can be refracted and scattered by the silica frame (light diffusivity), too. Thus, they can be applied to lightning such as LED to increase luminous efficiency, too.

Besides, with aggregability of the skeleton nanoparticles, it is possible to form irregularity when the skeleton nanoparticles are applied on a base plate. Here, the skeleton nanoparticles have the cubic frame structure. Thus, only a silica frame portion of the skeleton nanoparticles is contacted with a substance that approaches an upper side of the base plate. Thereby, it is possible to reduce a contact area. Consequently, they can be applied as a super-hydrophobic membrane and a superhydrophilic membrane, too.

Thus, there is provided a method of manufacturing skeleton nanoparticles that can further expand the application field of the nanoparticles comprising the silica shell and that can be used for various purposes.

Moreover, the method for manufacturing the skeleton nanoparticles according to the present invention uses the dry powdered organic acid-coated calcium carbonate particles made by coating the surfaces of the calcium carbonate particles in the dry powder state with the organic acid. More specifically, the surfaces of the calcium carbonate particles as the core particles are coated with the organic acid. Thus, it prevents a situation where the calcium carbonate particles as the core particles mutually aggregate by absorbing the water in a process of coating with the silica shell. Consequently, skeleton nanoparticles, which are obtained by dissolving the calcium carbonate in the silica-forming particles whose aggregation is prevented, have less aggregation and a high dispersibility, too.

In addition, by using the dry powdered organic acid-coated calcium carbonate particles made by coating the surfaces of the calcium carbonate particles in the dry powder state with the organic acid, property change of raw materials is unlikely to occur. Thus, quality control is inexpensive and it is possible to achieve cost reduction. Thereby, it is possible to improve mass productivity.

Accordingly, it is possible to obtain skeleton nanoparticles that can reduce cost and improve production efficiency and that have less aggregation into secondary particles and a high dispersibility.

In the method for manufacturing the skeleton nanoparticles according to the invention of claim 10, the proportion of each of the pores of the skeleton nanoparticles is within the range of 3% to 94% in terms of the surface area of each of the faces of the cubic frame. Thus, there are provided skeleton nanoparticles that can more easily insert and release substances of various sizes such as an active ingredient. In addition, the skeleton nanoparticles easily contact with an external substance or easily transmit liquid, gas or the like. Thus, in addition to the effects of claim 9, there are provided skeleton nanoparticles that can be easily used for various purposes.

In the method for manufacturing the skeleton nanoparticles according to the invention of claim 11, the width of the silica frame is within the range of 5 nm to 115 nm. Thus, there are provided skeleton nanoparticles that are not easily broken by an outside environment and that have high transparency. Accordingly, in addition to the effects of claim 9 or claim 10, there are provided skeleton nanoparticles that can be adopted for an application that requires high strength of the silica shell and a high degree of transparency.

In the method for manufacturing the skeleton nanoparticles according to the invention of claim 12, the organic acid is the rosin acid. Thus, it is possible to surely coat the calcium carbonate particles in the dry powder state and prevent aggregation of the core particles. Accordingly, in addition to the effects of one of claim 9 to claim 11, it is surely possible to obtain skeleton nanoparticles that have less aggregation into secondary particles and have a high dispersibility.

In the method for manufacturing the skeleton nanoparticles according to the invention of claim 13, the organic solvent is at least the one kind selected from the alcohol series, the ketone series, and the ether series, thereby surely dissolving the part of the organic acid. However, it has low solubility in the organic acid and has weak interactivity (affinity) with the calcium carbonate particles and the silicon alkoxide. Consequently, the silica shell produced by the hydrolysis of the silicon alkoxide is easily adsorbed to only the edge portion, which came out by dissolving the organic acid, of the calcium carbonate. In addition, the alcohol series solvent, the ketone series solvent, and the ether series solvent are easily available and relatively cheap. Accordingly, in addition to the effects of one of claim 9 or claim 12, it is possible to increase reaction efficiency and improve production efficiency. In addition, it is possible to achieve cost reduction, too.

In the method for manufacturing the skeleton nanoparticles comprising the silica shell according to the invention of claim 14, the silicon oil is further mixed with the medium. Thus, surfaces of the silica-forming particles are protected by the silicon oil and adsorption of the silica shell on the surfaces of the calcium carbonate particles is stabilized. Accordingly, in addition to the effects of one of claim 9 to claim 13, it is possible to further increase reaction efficiency and improve production efficiency. In addition, aggregation of the silica-forming particles is prevented in a reaction solution for forming the silica shell, since the surfaces of the silica-forming particles are protected. Moreover, the nanoparticles comprising the silica shell, which are obtained by dissolving the calcium carbonate, are also prevented from aggregating, since their surface are protected by the silicon oil. Thus, it is possible to obtain skeleton nanoparticles that have still less aggregation into secondary particles and have a higher dispersibility.

The amino-modified silicon oil is more preferable. The amino-modified silicon oil has high reactivity with the surfaces of the silica-forming particles. Thus, it is possible to obtain skeleton nanoparticles that have a high recovery percentage and a low particle size distribution by mixing with the amino-modified silicon oil.

In the method for manufacturing the skeleton nanoparticles according to the invention of claim 15, the ultrasonic treatment was conducted in the silica formation step. Thus, the organic acid-coated calcium carbonate particles are easily dispersed and mutual aggregation thereof is further prevented. Also, it prevents aggregation of the silica-forming particles wherein the silica shell is formed in a state where the particles are dispersed. Accordingly, in addition to the effects of one of claim 9 to claim 14, it is possible to obtain skeleton nanoparticles that have still less aggregation into secondary particles and have a higher dispersibility. In addition, the silica shell is easily adsorbed on the surface of the calcium carbonate by the ultrasonic wave. Thus, it is possible to further increase reaction efficiency and improve production efficiency.

BRIEF DESCRIPTION OF THE DRAWINGS

FIG. 6A is a schematic view showing an example made by using the skeleton nanoparticles according to the embodiment of the present invention in LED, and FIG. 6B is an enlarged view thereof.

FIG. 7 is an explanatory diagram to illustrate an application of the skeleton nanoparticles according to the embodiment of the present invention to a catalyst carrier.

FIG. 8A is diagram showing an example of use in a cleaning filter, and FIG. 8B is a schematic diagram showing an example of use in a mask.

FIG. 9 is an explanatory diagram to illustrate an application of the skeleton nanoparticles according to the embodiment of the present invention to an electrolyte holder.

FIG. 10 is an explanatory diagram to illustrate an application of the skeleton nanoparticles according to the embodiment of the present invention to a super-hydrophobic membrane and a superhydrophilic membrane.

FIG. 11 is a schematic diagram to illustrate conventional hollow silica nanoparticles wherein they are in the form of a cube and an entire surface thereof is formed of a silica shell.

FIG. 14E is a scanning electron microscope (SEM) photograph (SEI: scanning secondary electron image and STEM: scanning transmission electron image) of Example 8 of a product wherein the reaction time of the silica formation step is set at 120 minutes, and FIG. 14F is a scanning electron microscope (SEM) photograph (SEI: scanning secondary electron image) of Example 11 of a product wherein the reaction time of the silica formation step is set at 240 minutes.

FIG. 16C is a scanning electron microscope (SEM) photograph (SEI: scanning secondary electron image and STEM: scanning transmission electron image) of Example 14 of a product that uses 2-propanol as the organic solvent, and FIG. 16D is a scanning electron microscope (SEM) photograph (SEI: scanning secondary electron image and STEM: scanning transmission electron image) of Example 15 of a product that uses 1-butanol as the organic solvent.

FIG. 17A is a scanning electron microscope (SEM) photograph (SEI: scanning secondary electron image and STEM: scanning transmission electron image) of Comparative Example 5 of a product that uses methanol as the organic solvent, and FIG. 17B is a scanning electron microscope (SEM) photograph (SEI: scanning secondary electron image) of Comparative Example 6 of a product that uses 1-octanol as the organic solvent.

FIG. 18A is a scanning electron microscope (SEM) photograph (SEI: scanning secondary electron image and STEM: scanning transmission electron image) of Example 16 of a product that uses methyl ethyl ketone as the organic solvent, and FIG. 18B is a scanning electron microscope (SEM) photograph (SEI: scanning secondary electron image) of Comparative Example 7 of a product that uses acetone as the organic solvent.

FIG. 20 is a scanning electron microscope (SEM) photograph (SEI: scanning secondary electron image) of Comparative Example 9 of a product that uses diethylene glycol as the organic solvent.

FIG. 21 is an explanatory diagram to illustrate a form of particles of skeleton nanoparticles manufactured using a different organic solvent.

EXPLANATION OF CODES

Figure 1:
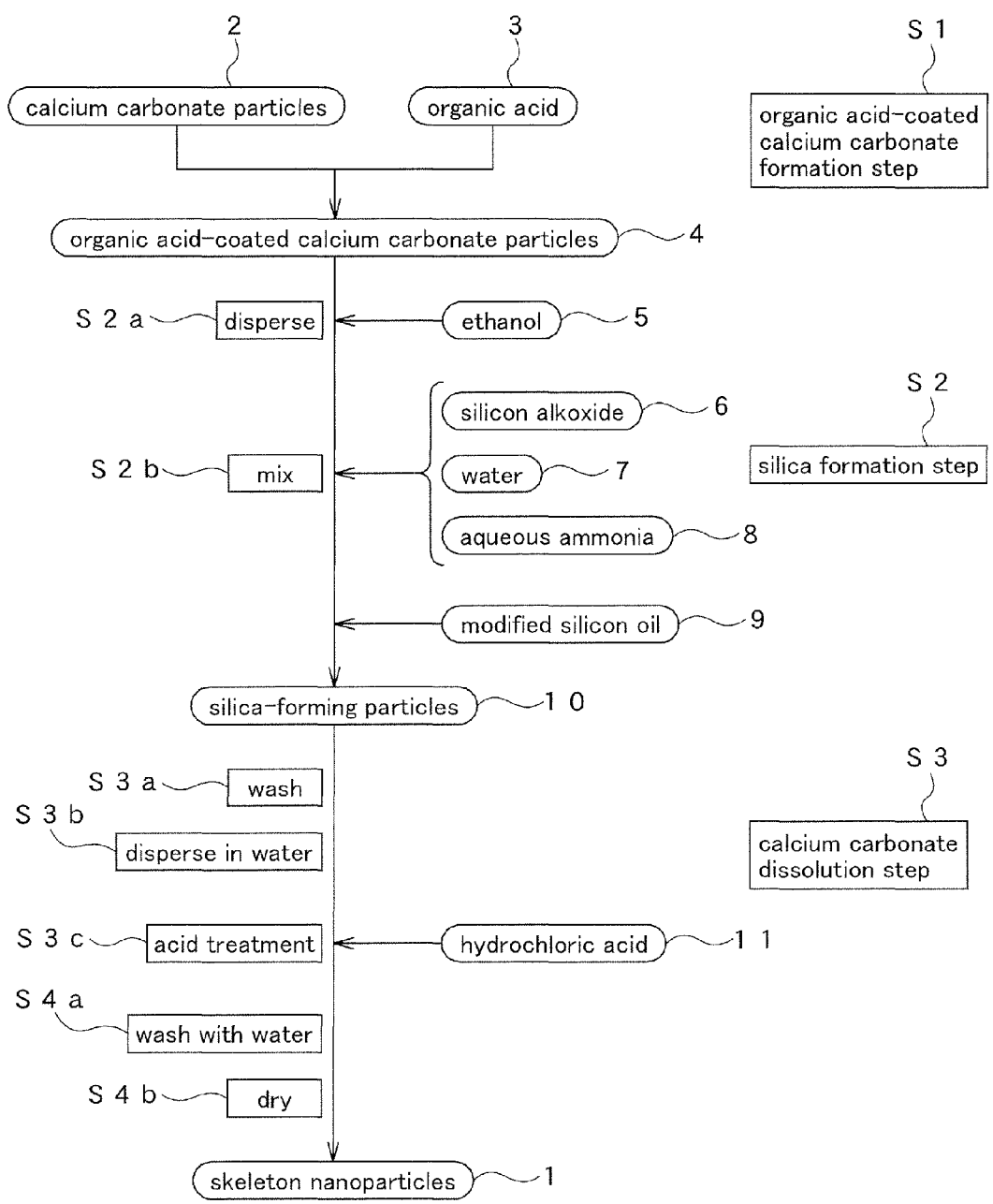
FIG. 1 is a flowchart showing a method for manufacturing skeleton nanoparticles according to an embodiment of the present invention.

1: skeleton nanoparticles
2: calcium carbonate particles
3: organic acid
4: organic acid-coated calcium carbonate particles
5: ethanol (organic solvent)
6: silicon alkoxide
7: aqueous ammonia (base catalyst)
9: modified silicone oil
10: silica-forming particles

MODE(S) FOR EMBODYING THE INVENTION

Embodiments of the present invention are described hereafter referring to the drawings.

In the embodiments, same symbols and same codes mean the same or equivalent function parts. Therefore, their redundant detail description is omitted here.

Embodiment

First, skeleton nanoparticles according to an embodiment of the present invention and a method for manufacturing the same are described referring to FIG. 1 to FIG. 4.

As shown in a flowchart of FIG. 1, in a method for manufacturing skeleton nanoparticles 1 according to the embodiment, first, surfaces of calcium carbonate ($CaCO_3$) particles 2 in a dry powder state (in a state of dry and solid fine powder) are coated with an organic acid 3 to form dry powdered organic acid-coated calcium carbonate particles 4 in an organic acid-coated calcium carbonate formation step (STEP S1).

Here, the dry powdered calcium carbonate particles 2 are in the form of a cube, and the organic acid-coated calcium carbonate particles 4 made by coating the calcium carbonate particles 2 with the organic acid 3 are also in the form of the cube as shown in FIG. 2.

As the dry powdered calcium carbonate particles 2, commercially available calcium carbonate particles may be purchased and used. For example, particulate calcium carbonate manufactured by Hayashi-Kasei Co., Ltd., synthetic calcium carbonate manufactured by Shiraishi Kogyo Kaisha, Ltd. or the like may be used.

In addition, for example, the dry powdered calcium carbonate particles 2 may be manufactured by a method in which calcium carbonate crystals are grown in an aqueous solution, and then aged and dehydrated. This may be used, too. The calcium carbonate crystals produced by the method are calcite and a hexagonal system. However, they can be grown into a shape as if it were a cubic system or can be grown to the "form of the cube" by controlling their synthesis condition. The method of growing the crystal in the aqueous solution is not particularly limited. A method in which carbon dioxide is introduced into a calcium hydroxide slurry to precipitate calcium carbonate, a method in which soluble carbonate such as sodium carbonate is added to an aqueous solution of soluble calcium salt such as calcium chloride to precipitate calcium carbonate or the like may be applied. Here, as will be hereafter described, it is desirable that a relatively low temperature is set and the speed of such precipitation reaction of the calcium carbonate is accelerated in order to obtain intended calcium carbonate particles 2 that have an outer diameter ranging from 8 nm to 200 nm. For example, in the method in which the carbon dioxide is introduced into the calcium hydroxide slurry, a solution temperature when the carbon dioxide is introduced is preferably set at 30 degrees Celsius or less and the speed of introducing the carbon dioxide is preferably set at 1.0 L/min or more per 100 grams of the calcium hydroxide.

The dry powdered calcium carbonate particles 2 preferably have a size such that an outer diameter measured by a microscopic method is within a range of 8 nm to 200 nm. Consequently, an outer diameter of finally obtained hollow skeleton silica nanoparticles 1, which is measured by the microscopic method, may be set within a range of 30 nm to 300 nm.

The organic acid 3 may be one that can prevent aggregation of the calcium carbonate particles 2 in a process of forming the silica shell by coating the dry powdered calcium carbonate particles 2. For example, acrylic soap of a rosin acid, etc. or the like is used.

The dry powdered organic acid-coated calcium carbonate particles 4 may be prepared (formed) by, for example, mixing commercially available dry powdered calcium carbonate particles 2 with the organic acid 3, or adding the organic acid 3 after adding (blowing) a carbonate source to (into) a calcium hydroxide suspension or the like.

Subsequently, the organic acid-coated calcium carbonate particles 4 are dispersed in ethanol 5 as an organic solvent that can dissolve a part of the organic acid 3 in the organic acid-coated calcium carbonate particles 4 in a silica formation step (STEP S2a) to dissolve the part of the organic acid 3 in the organic acid-coated calcium carbonate particles 4. Moreover, a silicon alkoxide 6, aqueous ammonia (NH$_4$OH) 8 as a base catalyst, water 7, and a modified silicon oil 9 as a silicon oil are further mixed (STEP S2b) to form silica-forming particles 10 wherein a silica (SiO$_2$) shell 1a is formed on the calcium carbonate particles 2 by a sol-gel method (STEP S2).

In the embodiment, such reaction was made while applying an ultrasonic wave (frequency: 20 KHz to 40 KHz) in order to form the silica shell 1a by the sol-gel method while sufficiently dispersing the organic acid-coated calcium carbonate particles 4 (which include the ones in which organic acid 3 is partially dissolved, too).

Figure 2A:
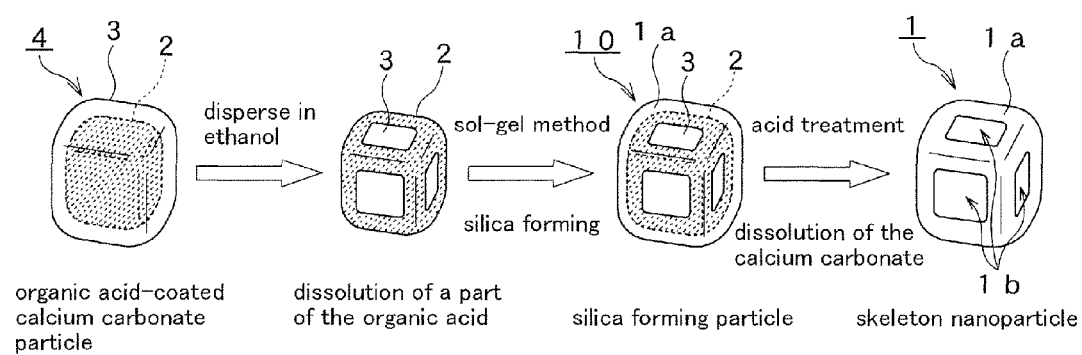
FIG. 2A is a schematic diagram showing manufacturing steps of the skeleton nanoparticles according to the embodiment of the present invention.
Figure 2B:
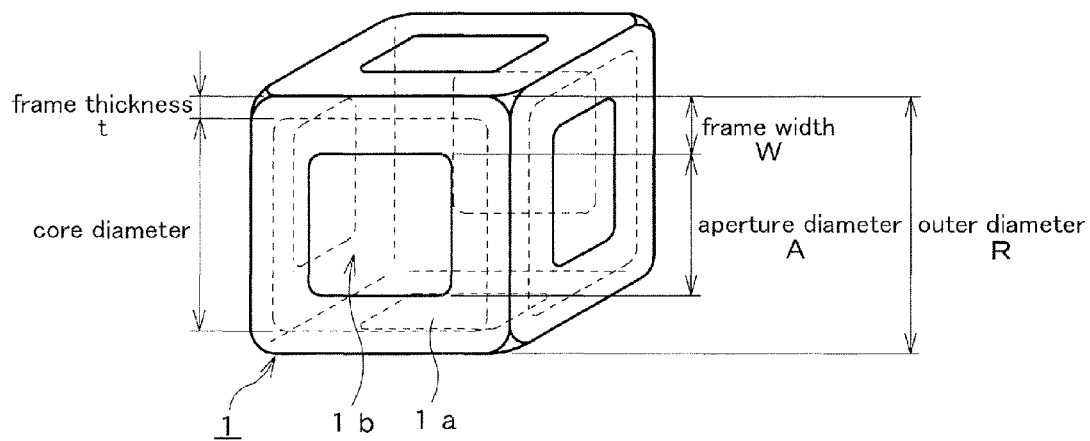
FIG. 2B is a schematic diagram showing a quadrilateral silica frame portion of the skeleton nanoparticles according to the embodiment of the present invention.

Here, when the organic acid-coated calcium carbonate particles 4 are dispersed in the ethanol 5 as the organic solvent, as shown in FIG. 2A, the organic acid 3 at an edge portion of the calcium carbonate particles 4 in the form of the cube is dissolved (the part of the organic acid is dissolved). Moreover, when the silicon alkoxide 6, the aqueous ammonia 8 as the base catalyst, and the water 7 are further mixed, the silica shell 1a, which is obtained by polycondensation of SiO2 molecules produced by hydrolysis of the silicon alkoxide 6, is formed on an edge portion, which came out by dissolving the organic acid 3, of the calcium carbonate particles 2 to form the silica-forming particles 10.

In the embodiment, the modified silicon oil 9 is mixed. Thus, surfaces of the silica-forming particles 10 are to be protected by the modified silicon oil 9.

Here, in the embodiment, the ethanol 5 was used as the organic solvent. However, in the practice, the present invention may use, as the organic solvent, one that can dissolve the part of the organic acid 3 in the organic acid-coated calcium carbonate particles 4 and that is soluble in the silicon alkoxide 6 and the water 7. The organic solvent more preferably has 10% to 60% of solubility to of the organic acid 3 in the organic acid-coated calcium carbonate particles 4.

In addition, as the silicon alkoxide 6 for coating the surfaces of the calcium carbonate particles 2 with the silica shell 1a by the sol-gel method, various silicon alkoxides including tetraethoxysilane (TEOS) may be used. More specifically, for example, ethyl silicate manufactured by Tama Chemicals Co. Ltd. {product name "high purity ethyl orthosilicate": tetraethoxysilane (TEOS)}, alkoxysilane in functional silanes manufactured by Shin-Etsu Chemicals. Co., Ltd. {product name "KBE-04": tetraethoxysilane (TEOS)} or the like may be used.

In the embodiment, the aqueous ammonia 8 was used as the base catalyst. However, in the practice of the present invention, as the base catalyst, other amines or the like, for example, may be used, too. However, ammonia is optimal for the base catalyst from viewpoints of good reaction efficiency, price, availability, usability or the like. When the ammonia is used as the base catalyst, it is possible to precipitate the silica, which is produced by the polycondensation of the SiO$_2$ molecules, by reacting the silicon alkoxide 6 and the water 7. Thus, it is possible to form the silica shell 1a on the calcium carbonate particles 2.

Moreover, used as the modified silicone oil 9 is a modified silicone oil wherein a hydrophilic organic group such as a polyether group, an ethoxy group and a carboxyl group is introduced therein, a modified silicone oil wherein a lipophilic organic group such as a monoamine group and an alkyl group is introduced therein or the like. Among them, a monoamine-modified silicone oil that is easily available and that has high reactivity to protect the surfaces of the silica-forming particles 10 is preferably used as the modified silicon oil 9. Incidentally, in case of using as the modified silicone oil 9 the modified silicon oil wherein the lipophilic organic group such as the monoamine group, the amino group and the alkyl group is introduced therein, there are provided lipophilic skeleton nanoparticles 1 and they are easily dispersed in the organic solvent or a solvent paint. On the other hand, in case of using a modified silicone wherein a hydrophilic organic group such as a polyether group, an ethoxy group and a carboxyl group is introduced therein, there are provided hydrophilic skeleton nanoparticles 1 and they are easily dispersed in the water or a water paint.

As a device for use in irradiation of the ultrasonic wave, available are a type in which an ultrasonic horn is directly immersed in a solution (UH-600S, frequency of 20 KHz/ SMT Co., Ltd., Sonifier 4020-800, frequency of 40 KHz/ Branson Ultrasonics Corporation), a type in which a solution is circulated (UH-600SR, frequency of 20 KHz/SMT Co., Ltd.), or a bath-type in which a reservoir that is filled with a solution is irradiated indirectly from outside the reservoir (ultrasonic washing machine type) or the like.

Next, the silica-forming particles 10 thus formed are washed (STEP S3a) and then dispersed in water (STEP S3b). In addition, a hydrochloric acid 11 is added as an acid treatment (STEP S3c) to dissolve the internal calcium carbonate 2 and let it out with remaining organic acid 3 in a calcium carbonate dissolution step (STEP S3). Finally, after water washing (STEP S4a) is performed, resultant particles are dried (STEP S4b). Thus, the skeleton nanoparticles 1 are manufactured.

In the above-described calcium carbonate dissolution step (STEP S3), a hydrogen ion concentration index of the dispersion by the acid treatment is preferably set at pH5 or less. This is because it is difficult to completely dissolve the internal calcium carbonate 2 in a state where the hydrogen ion concentration index of the dispersion exceeds pH 5. Incidentally, in the practice of the present invention, as the acid treatment, other acid such as a nitric acid, an acetic acid, and a citric acid may be used, too.

Figure 3A:
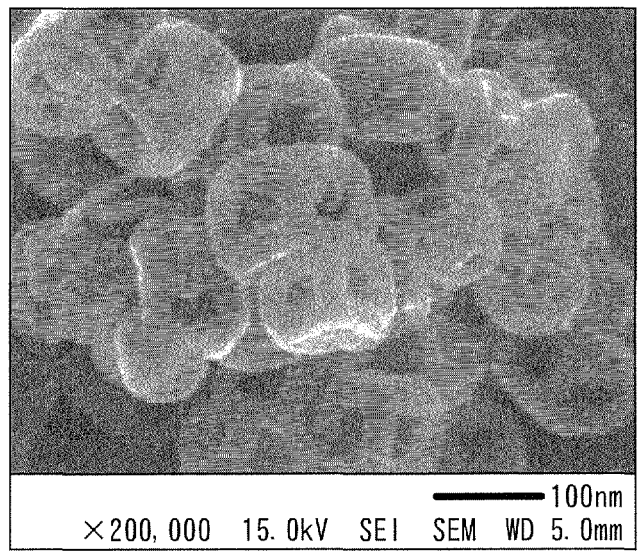
FIG. 3A is a scanning electron microscope (SEM) photograph (SEI: scanning secondary electron image) of the skeleton nanoparticles according to the embodiment of the present invention.

The skeleton nanoparticles 1 thus manufactured comprise the silica shell 1a that was formed along the edge of the calcium carbonate particles 2 in the form of the cube as described above. Thus, as shown in FIG. 2A, the silica shell 1a has the shape of the cubic frame and have pores 1b between substantially quadrilateral silica frames on respective faces of the cubic frame. In addition, the skeleton nanoparticles 1 are made by dissolving the calcium carbonate 2 after forming the silica shell 1a. Thus, the cubic frame is hollow inside. For confirmation, a photograph of the skeleton nanoparticles 1, which is taken by a scanning electron microscope (measured using SEM: JSM-7600F/LEOL Ltd.), is shown in FIG. 3A.

In addition, the skeleton nanoparticles 1 have an outer diameter R (See FIG. 2B) ranging from 30 nm to 300 nm by measurement using a microscopic method (SEM observation here). The pores 1b formed on the respective faces have a substantially quadrilateral shape and have an aperture diameter A (See FIG. 2B) ranging from 5 nm to 290 nm. Thus, a proportion (aperture ratio) of each of the pores 1b is within a range of 3% to 94% in relation to a surface area of each of the faces of the cubic frame. In addition, when the proportion of each of the pores 1b is within the range of 3% to 94% in relation to the surface area of each of the faces of the cubic frame, a width W (See FIG. 2B) of the substantially quadrilateral silica frame is within a range of 3 nm to 115 nm. The skeleton nanoparticles 1 preferably have an aperture diameter A ranging from 10 nm to 280 nm, a proportion (aperture ratio) of each of the pores 1b in relation to the surface area of each of the faces of the cubic frame ranging from 10% to 87%, or a width W of the silica frame ranging from 5 nm to 100 nm from viewpoints of strength, usability or the like.

Incidentally, the "proportion (aperture ratio) of the pores (1b)" is calculated by the following formula here.

A proportion of the pores (aperture ratio) (%)={$A$ (aperture diameter)}$^2$/{$R$ (outer diameter)}$^2$×100

In addition, the width W of the silica frame may be also calculated by the following formula in addition to the measurement using the microscopic method (SEM observation).

The width $W$ of the silica frame={$R$ (outer diameter)−$A$ (aperture diameter)}/2

Figure 3B:
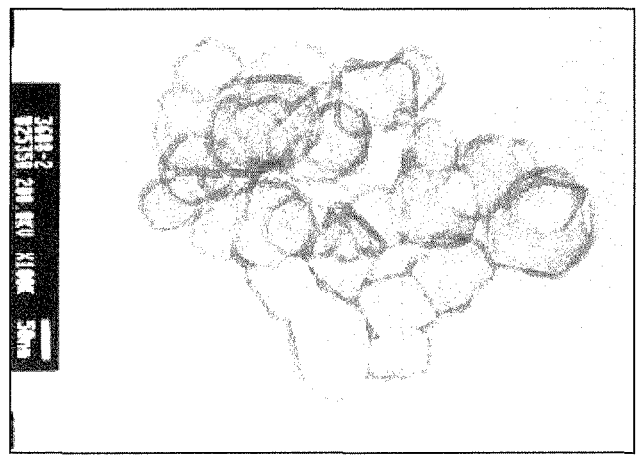
FIG. 3B is a transmission electron microscope (TEM) photograph of the skeleton nanoparticles according to the embodiment of the present invention.

The silica shell 1a is formed along the edge of the calcium carbonate particles 2. In the present first embodiment, an outer diameter (core diameter) of the calcium carbonate particles 2 as core particles is within a range of 8 nm to 200 nm. Thus, a thickness t (See FIG. 2B) of the silica frame is within a range of 1 nm to 10 nm with a maximum range of 10 nm to 30 nm. It is confirmed in measurement by a microscopic method (TEM observation here), too. For confirmation, a photograph of the skeleton nanoparticles 1, which is taken by a scanning electron microscope (measured using TEM: JEOL JEM 2000 FX/LEOL Ltd.), is shown in FIG. 3B.

Here, in order to examine an influence of a weight ratio of the dry powdered organic acid-coated calcium carbonate particles 4 to the silicon alkoxide 6, or an influence of an amount of the base catalyst on a particle form of the skeleton nanoparticles 1, Example 1 to Example 7 were made by varying corresponding blending ratios or corresponding amounts, and a manufacturing test was conducted. In addition, a manufacturing test on each of blends of Comparative Example 1 and Comparative Example 2 was conducted for comparison, too. Each of blending contents of the Example 1 to the Example 7, the Comparative Example 1, and the Comparative Example 2 is shown in TABLE 1.

Figure 4:
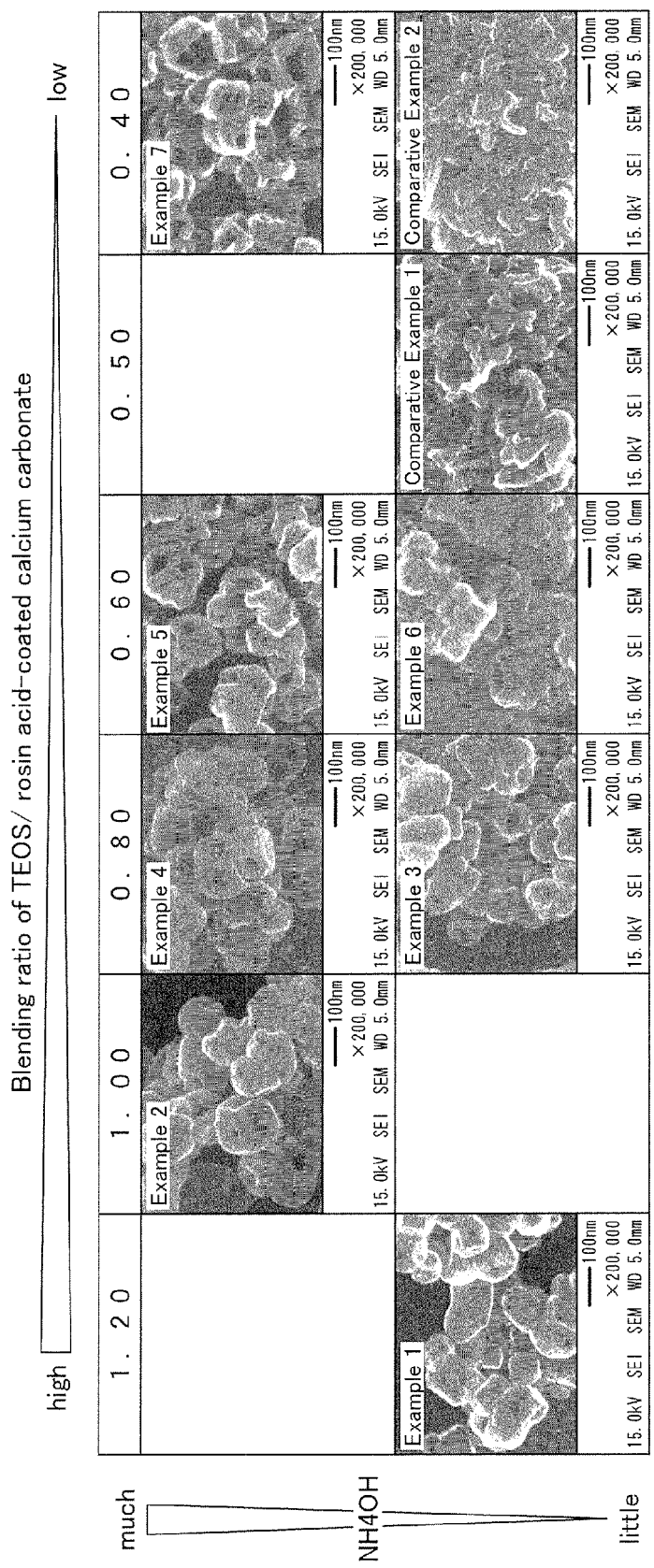
FIG. 4 is a schematic diagram showing scanning electron microscope (SEM) photographs (SEI: scanning secondary electron image) of skeleton nanoparticles according to Example 1 to Example 7 of the present invention as compared with Comparative Example 1 and Comparative Example 2.

Here, as the organic acid-coated calcium carbonate particles 4, rosin acid-coated calcium carbonate particles manufactured by Shiraishi Kogyo Kaisha, Ltd. {product name "Homocal D (primary particle diameter: 80 nm)"} were used. In addition, as the silicon alkoxide 6, tetraethoxysilane (TEOS) (product name "KBE-04") was used. Moreover, as the base catalyst, the aqueous ammonia 8 was used. Each of blending ratios is expressed in parts by weight. In addition, photographs of those manufactured using the respective blending contents according to the flowchart of FIG. 1, which are taken by a scanning electron microscope (measured using SEM: JSM-7600F/LEOL Ltd.), are shown in FIG. 4.

TABLE 1

| | | | | | | (parts by weight) |
|---|---|---|---|---|---|---|
| | | Example 1 | Example 2 | Example 3 | Example 4 | Example 5 |
| silica formation step | rosin acid-coated calcium carbonate | 24.51 | 24.92 | 25.34 | 25.34 | 25.78 |
| | TEOS | 29.41 | 24.92 | 20.27 | 20.27 | 15.47 |
| | ethanol | 245.10 | 249.20 | 253.40 | 253.39 | 257.80 |
| | water | 114.03 | 114.03 | 114.03 | 114.03 | 114.03 |
| | silicon oil | 4.56 | 4.56 | 4.56 | 4.56 | 4.56 |
| | ammonia | 2.85 | 11.40 | 2.85 | 11.40 | 11.40 |
| calcium carbonate dissolution step | water | 1660.00 | 1680.00 | 1712.00 | 1840.00 | 1740.00 |
| | hydrochloric acid | 41.50 | 42.00 | 42.80 | 46.00 | 43.50 |
| | pH of mixing | 1 | 1 | 1 | 1 | 1 |
| | ratio (%) *1 | 1.69 | 1.69 | 1.69 | 1.82 | 1.69 |
| recovered amount | dry weight (g) | 3.07 | 7.16 | 3.35 | — | 3.90 |
| | TEOS ratio (%) *2 | 10.44 | 28.73 | 16.53 | 5.32 | 25.21 |
| NH3/TEOS | | 0.10 | 0.46 | 0.14 | 26.24 | 0.74 |
| H2O/TEOS | | 3.88 | 4.58 | 5.63 | 21.42 | 7.37 |
| TEOS/rosin acid-coated calcium carbonate | | 1.20 | 1.00 | 0.80 | 0.80 | 0.60 |

TABLE 1-continued

| | | Example 6 | Example 7 | Comparative Example 1 | (parts by weight) Comparative Example 2 |
|---|---|---|---|---|---|
| silica formation step | rosin acid-coated calcium carbonate | 25.78 | 26.23 | 26.00 | 26.23 |
| | TEOS | 15.47 | 10.49 | 13.00 | 10.49 |
| | ethanol | 257.80 | 262.30 | 260.00 | 262.30 |
| | water | 114.03 | 114.03 | 114.03 | 114.03 |
| | silicon oil | 4.56 | 4.56 | 4.56 | 4.56 |
| | ammonia | 2.85 | 11.40 | 2.85 | 2.85 |
| calcium carbonate dissolution step | water | 1740.00 | 1768.00 | 1756.00 | 1768.00 |
| | hydrochloric acid | 43.50 | 44.20 | 43.90 | 44.20 |
| | pH of mixing | 1 | 1 | 1 | 1 |
| | ratio (%) *1 | 1.69 | 1.69 | 1.69 | 1.69 |
| recovered amount | dry weight (g) | 1.57 | 2.97 | 1.20 | 0.66 |
| | TEOS ratio (%) *2 | 10.15 | 28.31 | 9.23 | 6.29 |
| NH3/TEOS | | 0.18 | 1.09 | 0.22 | 0.27 |
| H2O/TEOS | | 7.37 | 10.87 | 8.77 | 10.87 |
| TEOS/rosin acid-coated calcium carbonate | | 0.60 | 0.40 | 0.50 | 0.40 |

*1 ratio (%): hydrochloric acid/rosin acid-coated calcium carbonate
*2 TEOS ratio (%): dry weight (g)/amount of TEOS (g) × 100

As shown in FIG. 4, the Example 1 to Example 6 prove that when a blending ratio of the tetraethoxysilane (TEOS) to the rosin acid-coated calcium carbonate is within a range of 1.2 to 0.6, there is surely provided a particle form wherein the silica shell has a shape of a cubic frame. In addition, the Example 7 shows that even if the blending ratio of the tetraethoxysilane (TEOS) to the rosin acid-coated calcium carbonate is 0.4, when an amount of the aqueous ammonia 8 as the base catalyst is large, there is provided a particle form wherein the silica shell has the shape of the cubic frame.

On the other hand, the Comparative Example 1 and the Comparative Example 2 show that if the amount of the aqueous ammonia 8 as the base catalyst is small, when the blending ratio of the tetraethoxysilane (TEOS) to the rosin acid-coated calcium carbonate is 0.5 or less, there takes place a case where the silica shell does not make a particle form of the cubic frame.

According to the experiments and research of the present inventors, it is confirmed that if the blending ratio of the tetraethoxysilane (TEOS) to the rosin acid-coated calcium carbonate is 1.3 or more, unreacted tetraethoxysilane (TEOS) increases, thereby taking time and efforts for recovering or making the silica-forming particles 10 easily aggregate in washing (STEP S3a) after forming the silica. On the other hand, it is confirmed that if the blending ratio of the tetraethoxysilane (TEOS) to the rosin acid-coated calcium carbonate is 0.3 or less, even when an amount of the aqueous ammonia 8 as the base catalyst is large, an amount of the tetraethoxysilane (TEOS) required for the silica frame is insufficient, thereby resulting in a situation where the silica shell 1a does not have the shape of the cubic frame.

Thus, the blending ratio of the tetraethoxysilane (TEOS) to the rosin-coated calcium carbonate is preferably within a range of 0.4 to 1.2, more preferably within a range of 0.6 to 1.2 in order to surely manufacture the skeleton nanoparticles 1 wherein the silica shell 1a has the shape of the cubic frame.

In addition, as shown in the photograph of FIG. 4, it was found that the higher the blending ratio of the tetraethoxysilane (TEOS) to the rosin-coated calcium carbonate was or the larger the amount of the tetraethoxysilane (TEOS) was, the bigger the width W of the silica frame was. Moreover, it was confirmed that the width W of the silica frame increased with a large amount of the aqueous ammonia 8 as the base catalyst, too.

Based on these facts, in the skeleton nanoparticles 1 according to the present embodiment, it is possible to control the form of the particles such as the outer diameter R (particle diameter) of the skeleton nanoparticles 1, the width W of the silica frame, and a size (aperture diameter A) of the pores 1b surrounded by the silica frames by varying a blending amount of the organic acid-coated calcium carbonate particles 4, the silicon alkoxide 6 or the base catalyst. Naturally, the above-described form of the particles can be controlled by adjusting the particle diameter of the calcium carbonate particles 2 to be the core particles or the like, too As described above, the skeleton nanoparticles 1 according to the present embodiment are made by: dispersing the dry powdered organic acid-coated calcium carbonate particles 4, which are made by coating the organic acid 3 on the surfaces of the calcium carbonate particles 2 in the dry powder state and in the form of the cube that have the predetermined sized outer diameter and in the dry powder state, in the ethanol 5 as the organic solvent that can dissolve the part of the organic acid 3 in the organic acid-coated calcium carbonate particles 4; further mixing the silicon alkoxide 6, the aqueous ammonia 8 as the base catalyst and the water 7 to form the silica-forming particles 10 with the silica shell 1a formed along the edge of the calcium carbonate particles 2; and then dissolving the calcium carbonate 2 in the silica-forming particles 10 by the hydrochloric acid 11 as the acid treatment.

In addition, the method for manufacturing the skeleton nanoparticles 1 according to the present embodiment comprises: the organic acid-coated calcium formation step (STEP S1) for coating the organic acid 3 on the surfaces of the calcium carbonate particles 2 that have the predetermined sized outer diameter and that is in the form of the cube and in the dry powder state to form the organic acid-coated calcium carbonate particles 4; the silica forming step (STEP S2) for dispersing the organic acid-coated calcium carbonate particles 4 in the ethanol 5 that can dissolve the part of the organic acid 3 in the organic acid-coated calcium carbonate particles 4, and further mixing the silicon alkoxide 6, the aqueous ammonia 8 as the base catalyst and the water 7 to form the silica-forming particles 10 with the silica shell 1a formed along the edge of the calcium carbonate particles 2; and the calcium carbonate dissolution step (STEP S3) for dissolving the calcium carbonate 2 in the silica-forming particles 10 by the hydrochloric acid 11 as the acid treatment.

As described above, the present embodiment uses the dry powdered organic acid-coated calcium carbonate particles 4 made by coating the organic acid 3 on the surfaces of the calcium carbonate particles 2 in the dry powder state. More specifically, the surfaces of the calcium carbonate particles 2 as the core particles are coated with the organic acid 3. Thus, it prevents the aggregation of the calcium carbonate particles 2, which is caused by the calcium carbonate particles 2 being exposed and absorbing the water, in the process of forming the silica shell 1a on the calcium carbonate particles 2. Consequently, the skeleton nanoparticles 1 obtained by dissolving the calcium carbonate 2 at the inside of the silica-forming particles 10, which are prevented from aggregating, have less aggregation and high dispersibility.

In particular, in the present embodiment, as described above, the ultrasonic treatment was conducted in the process of forming the silica-forming particles 10. Thus, the organic acid-coated calcium carbonate particles 4 (which also include the ones with the organic acid 3 partially dissolved) are easily dispersed and mutual aggregation thereof are prevented. In addition, the silica shell 1a is formed in the state where the particles are dispersed. Thus, the silica-forming particles 10 are also prevented from mutually aggregating. Consequently, the skeleton nanoparticles 1 obtained by dissolving the calcium carbonate 2 at the inside of the silica-forming particles 10, which are prevented from aggregating, are also prevented from aggregating with each other.

In addition, the modified silicon oil 9 is mixed with the medium, and the surface of the silica shell 1a is protected by the modified silicon oil 9. Thus, mutual aggregation of the silica-forming particles 10 is prevented by the modified silicon oil 9, too.

Consequently, the skeleton nanoparticles 1 according to the present embodiment have still less aggregation into secondary particles and exhibit higher dispersibility.

In addition, as described above, the skeleton nanoparticles 1 according to the present embodiment and the method for manufacturing the same use the dry powdered organic acid-coated calcium carbonate particles 4 made by coating the organic acid 3 on the surfaces of the calcium carbonate particles 2 in the dry powder state. Therefore, the property change of the raw materials is unlikely to occur. Thus, the quality control of the raw materials is inexpensive. Accordingly, it is possible to achieve cost reduction. In addition, it is possible to improve production efficiency or mass productivity, since the property change of the raw materials is unlikely to occur.

In addition, in the present embodiment, the silica shell 1a is easily adsorbed on the surfaces of the calcium carbonate particles 2 by the ultrasonic treatment.

Moreover, the surface of the silica shell 1a is protected by the modified silicon oil 9, and the adsorption of the silica shell 1a on the calcium carbonate particles 2 is stabilized.

Accordingly, in the skeleton nanoparticles 1 according to the present embodiment and the method for manufacturing the same, it is possible to increase reaction efficiency and improve production efficiency.

Here, an application field (purpose of use) of such skeleton nanoparticles 1 that comprise the silica shell 1a having the shape of the cubic frame is described referring to FIG. 5 to FIG. 10.

As described above, the skeleton nanoparticles 1 according to the present embodiment are the nanoparticles that have the outer diameter R ranging from 30 nm to 300 nm and that comprise the silica shell 1a. The silica shell 1a has the shape of the cubic frame. The cubic frame is hollow inside and the substantially quadrilateral silica frames on each of the faces of the cubic frame have the pores 1b formed therebetween.

Accordingly, in the skeleton nanoparticles 1 according to the present embodiment, it is easy to insert a substance such as an active ingredient into the cavity in the nanoparticles by the pores 1b, and it is easy to release an included substance, too.

Thus, first, an application to a delivery system utilizing the cubic frame structure of the skeleton nanoparticles 1 is provided.

Figure 5:
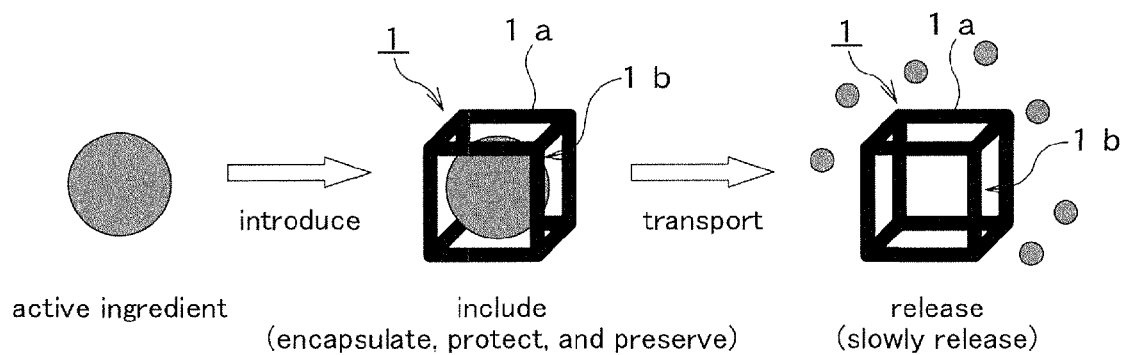
FIG. 5 is an explanatory diagram to illustrate an application of the skeleton nanoparticles according to the embodiment of the present invention to a delivery system.

More specifically, in the skeleton nanoparticles 1, as described above, the silica shell 1a has the shape of the cubic frame and the pores 1b are present between the silica frames. Thus, it is easy to insert a substance such as the active ingredient (for example, an unstable ingredient deteriorated by external stimuli such as a catalyst, a medicine, a vitamin compound, and a protein, or an ingredient that has an adverse effect on a surrounding at its original sate, or an ingredient that needs to be protected from an external environment) into the cavity formed inside through the pores 1b that are present between the frames. In addition, the inserted substance such as the active ingredient can be included by the silica frame. Moreover, the included substance such as the active ingredient is easily released through the pores 1b. Thus, as shown in FIG. 5, the skeleton nanoparticles 1 are utilized as the delivery system wherein the substance such as the active ingredient is inserted and included (encapsulated, protected, and preserved) in the cavity inside the skeleton nanoparticles 1, and the inclusion is transported to an intended cell or an intended tissue and released (slowly released).

In particular, in the skeleton nanoparticles 1 according to the present embodiment, as described above, the proportion of each of the pores 1b is within the range of 3% to 94% in relation to the surface area of each of the faces of the cubic frame. Moreover, it is possible to control the outer diameter R of the skeleton nanoparticles 1, the pore diameter (size of the pores 1b) between the silica frames, or the width W of the silica frame by adjusting the pore diameter of the calcium carbonate particles 2 to be the core particles 2 or the amount of the organic solvent, the silicon alkoxide 6 or the base catalyst. Thus, it is possible to insert active ingredients of various sizes containing large associated molecules such as a protein. Moreover, it is possible to transport the included substance by way of its intended purpose.

In addition, it is possible to provide it with inclusion capability and make it hard to release the substance inserted in the silica frame by performing a process of narrowing a space between the frame and a substance inserted in the frame or by a similar process via a surface modification of the silica shell 1a. On the other hand, after the included substance is transported to an intended place, it is possible to provide sustained release capability or to release the included substance by applying a treatment for making the included substance repel or a similar treatment, too. Moreover, it is possible to recover it by a magnetic force by covering it with magnetic particles as a surface modification of the silica shell 1a, too.

Here, a specific use of the delivery system by the skeleton nanoparticles 1 is further described. The delivery system by the skeleton nanoparticles 1 can be utilized in a medical field, a cosmetic field, a food field or the like.

In the medical field, in case a medicine (active ingredient) or the like is included in the cavity in the skeleton nanoparticles 1 as a drug delivery system, the skeleton nanoparticles 1 containing the medicine (active ingredient) or the like may pass through a gap between intravascular endothelial cells close to an affected area such as a tumor, arteriosclerosis and rheumatism that spreads to the degree of around 200 nm, since the skeleton nanoparticles 1 have the outer diameter R ranging from 30 nm to 300 nm. Consequently, it may be effective as a remedy.

In particular, skeleton nanoparticles 1 having an outer diameter of 100 nm to hundreds of nanometers are preferably used in order to make them stay in the body and exhibit an effect of the included medicine.

According to the experiments and research by the present inventors, it is confirmed that a drug delivery system by skeleton nanoparticles 1 that contain Leuplin for use in a treatment for a prostate cancer or Myocet for use in a treatment for a metastatic breast cancer is effective. In addition, it is confirmed that the sustained release performance is improved by using the skeleton nanoparticles 1 as a drug delivery system of a specific medicine for hepatitis C or a specific medicine for diabetes (insulin), thereby improving QOL of a patient, or that stability is improved by using the skeleton nanoparticles 1 as a delivery system of a specific medicine for peripheral arterial obstruction, thereby making targeting to an affected region better.

Besides, in the medical field, the skeleton nanoparticles 1 are effective as a pinpoint delivery system in which a physiological active substance such as a gene is encapsulated to introduce into an intended cell or an intended tissue effectively with pinpoint accuracy or a DNA delivery system in which a gene is introduced with fullerene, too.

In addition, in the cosmetic field, it is possible to include, for example, a ceramide molecule as a moistening ingredient of a skin, which is present between corneocytes in the skin, in the cavity in the skeleton nanoparticles 1 to pass the gap between corneocytes of 50 nm to 70 nm. Thus, it is effective as a moisture provision cosmetic. Besides, it is possible to include, for example, retinol (vitamin A) that is easily broken by the air, light or heat in the inner portion (hollow portion) of the skeleton nanoparticles 1 to deliver to a basal layer of a surface skin. Thus, it is effective as anti-fleck and anti-wrinkle cosmetic, too.

Moreover, in the food field, when a food additive such as flavoring ingredient or a vitamin compound is included in the skeleton nanoparticles 1 and added to a food, it is possible to reduce property change of the food additive or the vitamin (such as an antioxidative effect) by an outside environment such as the air.

Besides, for example, the skeleton nanoparticles 1 can be used in a form such that bath powder, an adhesive, a fertilizer or the like is included therein to protect it from the outside environment and to release it only in use.

Next, there is provided a use of the skeleton nanoparticles 1 in lighting equipment such as a LED light utilizing optical transparency or light diffusivity by the cubic frame structure thereof.

As described above, the skeleton nanoparticles 1 have the cubic frame structure with the hollow inner portion and have the pores 1b between the silica frames. Thus, it is possible to transmit the light through the pores 1b and they have the light permeability and transparency. In particular, in the present embodiment, the skeleton nanoparticles 1 have the outer diameter R ranging from 30 nm to 300 nm, the proportion of each of the pores 1b in relation to the surface area of each of the faces of the cubic frame ranging from 3% to 94%, and the width W of the silica frame ranging from 3 nm to 115 nm. Thus, they are high in the light permeability and the transparency. Moreover, it is possible to refract and scatter a part of incident light that entered through the pores 1b by the silica frame. Thus, they have a light diffusivity.

Here, a conventional LED light provides point emission (spot irradiation light). Thus, it should be arranged in a straight tube type or a bulb type without a gap and also has a problem that price or power consumption is high.

Thus, as shown in FIG. 6, when the skeleton nanoparticles 1 are applied to a surface of the LED lamp, the light permeability and the transparency are performed by the hollow inner portion of the skeleton nanoparticles 1 and by the pores 1b present between the silica frames. Moreover, the light entered through the silica frame is diffusely reflected, so that luminous efficiency increases. Thus, it provides widely diffused light that has brightness equal to or greater than that of fluorescence or the like. Consequently, it is possible to reduce power consumption.

In addition, it is possible to selectively transmit a light source such as LED in a three-dimensional direction (a straight direction, a vertical direction, an up-and-down direction or the like), since the pores 1b are present on each of the faces of the cubic frame. For example, it is possible to increase the luminous efficiency by using the skeleton nanoparticles 1 in a light guide plate for use in the light source such as the LED, thereby being able to obtain the widely diffused light required for use in the lighting.

Subsequently, there is provided a use of the skeleton nanoparticles 1 as a catalyst carrier utilizing passing capability (low passage resistance) of liquid or the like or inclusion capability by the cubic frame structure thereof.

More specifically, the skeleton nanoparticles 1 have the cubic frame structure and have the pores 1b between the silica frames. Thus, they easily transmit the liquid or the like and have a low passage resistance. Also, it is easy to contact an included substance and an external substance through the pores 1b. Thus, as shown in FIG. 7, when a photocatalyst such as titanium oxide or an unstable catalyst such as a gas contact catalyst is included in the skeleton nanoparticles 1, the included catalyst is contacted with a solvent such as an external water and an organic solvent or with a catalyzed substance via the pores 1b formed between the silica frames. Consequently, it is possible to effectively promote a catalysis as the catalyst carrier.

In particular, conventional mesoporous silica as the catalyst carrier has a high passage resistance of the liquid or the like. Thus, it has a limit in an improvement in decomposition performance of the catalyst. On the other hand, the skeleton nanoparticles 1 according to the present embodiment have the proportion of each of the pores 1b in relation to the surface area of each of the faces of the cubic frame ranging from 3% to 94%. Thus, they have the low passage resistance and it is possible to improve the decomposition performance of the catalyst as the catalyst carrier. Moreover, in case the catalyzed substance has affinity with the silica frame, catalysis efficiency is expected to be improved.

In addition, there is provided a use of the skeleton nanoparticles 1 as a filter utilizing the passing capability of the liquid or the like by the cubic frame structure thereof.

Figure 8A:
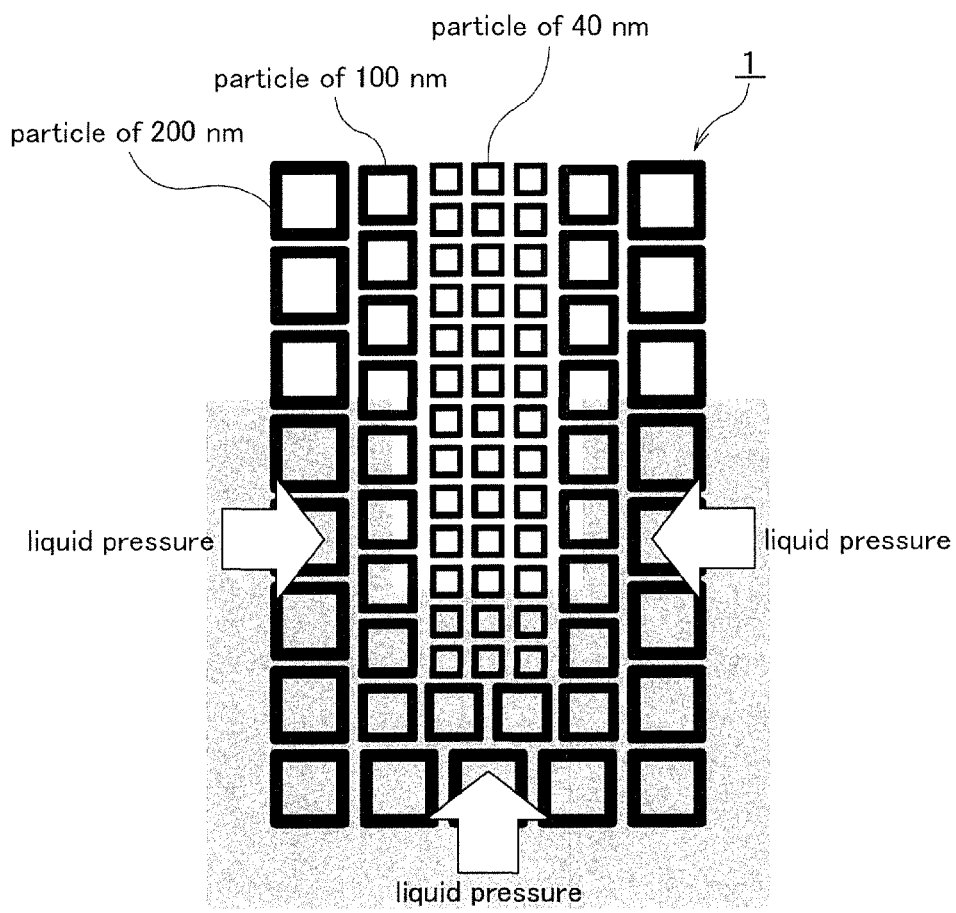
FIG. 8A and FIG. 8B are schematic diagrams and show examples made by using the skeleton nanoparticles according to the embodiment of the present invention in a filter.

For example, as a water purifying filter, as shown in FIG. 8A, large-sized skeleton nanoparticles 1 (for example, particles that have an outer diameter of 200 nm) are arranged at an outer side and small-sized skeleton nanoparticles 1 (for example, particles that have an outer diameter of 100 nm and particles that have an outer diameter of 40 nm) are arranged at an inner side in turn. Then, passage of impurities such as germs is blocked by the skeleton nanoparticles 1. Thus, liquid other than the impurities such as the germs may pass through the pores 1b of the skeleton nanoparticles 1 by its liquid pressure. Consequently, the impurities such as the germs are filtrated.

Figure 8B:
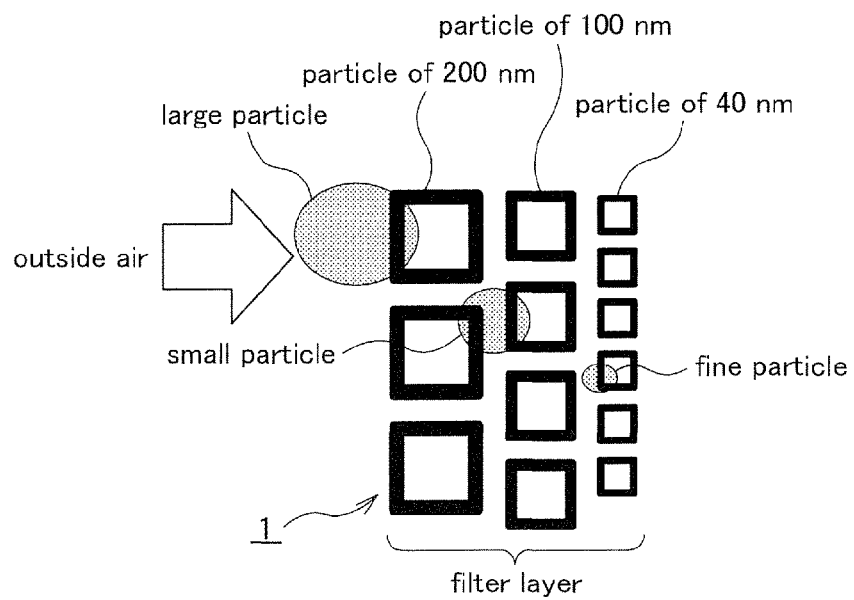

In addition, as a mask or an air filter, as shown in FIG. 8B, a lamination type filter is made by arranging the skeleton nanoparticles 1 in such a manner that the size of the particle diameter is gradually reduced from an outer side to an inner side (for example, skeleton nanoparticles 1 that have outer diameters of 200 nm, 100 nm, and 40 nm are arranged from the outer side in turn). Then, passage of pollen dust or influenza virus can be blocked by the skeleton nanoparticles 1, too. In particular, the skeleton nanoparticles 1 according to the present embodiment have a high aperture ratio of the pores 1b such that the proportion of each of the pores 1b is within the range of 3% to 94% in relation to the surface area of each of the faces of the cubic frame. Thus, they can sufficiently transmit outside air while highly blocking the passage of the pollen dust or the influenza virus as compared with a filter provided in a conventional fiber laminated and gap-type filter or a conventional filter made of a perforated plate. Thereby, it improves feeling of breathlessness in use of the mask. In addition, it can be incinerated after use and it does not generate gas in the incineration as in the case of using an organic fiber. Thus, it leads to a contribution to environmental protection, too.

Moreover, there is provided a use of the skeleton nanoparticles 1 as an electrolyte holder utilizing a difference in the passage resistance of the liquid or the like depending on a size of a particle diameter.

A microphase-separated gel (MPSD) in a conventional lithium polymer battery had a problem that an electrolyte is exuded by drying.

Thus, for example, as shown as FIG. 9, skeleton nanoparticles 1 that have an outer diameter of 100 nm are arranged around skeleton nanoparticles 1 that have an outer diameter of 200 nm, and skeleton nanoparticles 1 that have an outer diameter of 40 nm are further arranged therearound to fill up the skeleton nanoparticles 1 that have the outer diameter of 200 nm with an electrolyte of a lithium battery. It inhibits outflow of the electrolyte to the outside by the skeleton nanoparticles 1 having the outer diameter of 100 nm and 40 nm, while ensuring a migration amount of ions. Thus, it is possible to maintain the electrolyte.

Subsequently, there is provided a use of the skeleton nanoparticles 1 as a super-hydrophobic membrane and a superhydrophilic membrane utilizing the cubic frame structure thereof.

Here, when the skeleton nanoparticles 1 are dispersed in a resin and coated on (arranged on) a base plate, it is possible to form nano-sized irregularity on the base plate by their aggregability. In addition, in case the irregularity is formed on the base plate by the skeleton nanoparticles 1, as shown in FIG. 10, only silica frame portions of the skeleton nanoparticles 1 are contacted with a liquid substance or a gelled substance that moves toward a surface of the base plate, and their contact area is reduced, since the skeleton nanoparticles 1 have the cubic frame structure. Thus, it is effective as the super-hydrophobic membrane and the superhydrophilic membrane. In particular, in the skeleton nanoparticles 1 according to the present embodiment, it is possible to easily control the outer diameter of the skeleton nanoparticles 1 by adjusting the pore diameter of the calcium carbonate as the core particles or the amount of the organic solvent, the silicon alkoxide 6 or the base catalyst. Thus, it is easy to control a size of the nano-sized irregularity to be formed on the base plate, too. Thereby, it is easy to form a super-hydrophobic surface and a superhydrophilic surface.

In addition, when the irregularity is formed on the base plate by the skeleton nanoparticles 1, it is possible to make visible light that enters obliquely in relation to the base plate refract and scatter at the silica frame portion of the skeleton nanoparticles 1. Moreover, it is possible to make the visible light that enters substantially vertically in relation to the base plate transmit through the pores 1b of the skeleton nanoparticles 1. Thus, there is provided a utilization as an anti-reflection membrane.

Besides, there is provided an application as a cosmetic (for example, a lipstick and foundation) for making a wrinkle less noticeable utilizing light diffusivity of refraction and scattering by the silica frame portion of the skeleton nanoparticles 1 or for producing an optical lift-up effect by changing a texture of the skin.

In addition, there is provided an application as an oil absorption material designed to absorb oil or the like by the pores 1b of the skeleton nanoparticles 1. There is provided another application as a cosmetic (for example, oil blotting paper) wherein hydrophilicity and hydrophobicity are provided by the surface modification of the silica shell 1a, thereby being able to absorb only oil of the skin and leave water.

Moreover, there is provided an application as a microcapsule that utilizes inclusion capability of the skeleton nanoparticles 1 to contain and transport a magnetic property, flavoring ingredient, ink, temperature response, ultraviolet luminescence or the like, too. For example, in case of a capsule containing ink, it may be used such that the capsule is broken by a printing impact of a register to produce a color of the included ink.

Thus, in the skeleton nanoparticles 1 according to the present embodiment and the method for manufacturing the same, the application field of the nanoparticles comprising the silica shell can be further expanded and used for various purposes.

In particular, the skeleton nanoparticles 1 according to the present embodiment have the width W of the silica frame ranging from 3 nm to 115 nm as described above. Thus, they are not easily broken by the outside environment and have the high transparency. Consequently, they can be adopted for an application that requires high strength of the silica shell and a high degree of transparency, too. In addition, the proportion of each of the pores 1b is within the range of 3% to 94% in relation to each of the faces of the cubic frame. Thus, they are easily used for various purposes.

Here, the present inventors further conducted a manufacturing test in order to make efficient production or examine an influence of the reaction time (processing time) in the silica formation step on characteristics such as a recovery percentage of the skeleton nanoparticles 1 by making Example 8 to Example 11, Comparative Example 3, and Comparative Example 4 wherein the reaction time (processing time) in the silica formation step was variously changed.

In each of the Examples and the Comparative Examples, as the organic acid-coated calcium carbonate particles 4 made by coating the surfaces of the calcium carbonate particles 2 in the dry powder state with the organic acid 3, rosin acid-coated calcium carbonate particles {product name "Homocal D (in the form of a cube, an average particle size: 80 nm)" manufactured by Shiraishi Calcium Kaisha, Ltd.} were used. 2.50 grams of the rosin acid-coated calcium carbonate particles 2 were dispersed in 39.96 ml (31.53 grams) of the ethanol 5 as the organic solvent for 5 minutes using an ultrasonic homogenizer. Moreover, 1.61 ml (1.50 grams) of tetraethoxysilane (TEOS) ("KBE-04" manufactured by Shin-Etsu Chemicals. Co., Ltd.) as the silicon alkoxide 6 was further added and dispersed for 10 minutes using a shaker (150 rpm, 25 degrees Celsius). Then, 0.86 grams of 28% of reagent ammonia (NH4OH) water 8 as the base catalyst and 8.43 ml (8.43 grams) of distilled water 7 were added thereto to promote a sol-gel reaction in the shaker (150 rpm, 25 degrees Celsius) in each of reaction times shown in TABLE 2 to be described hereafter. Thus, the silica formation step (STEP S2) was conducted.

Subsequently, after a reaction suspension was centrifuged (3000 rpm, 10 minutes) to remove a supernatant, it was subjected to ethanol wash, newly centrifuged (3000 rpm, 10 minutes), and washed with distilled water. Moreover, after it was further centrifuged (3000 rpm, 10 minutes), 4.71 ml of 3N hydrochloric acid solution and 188.40 ml of the distilled water were added to dissolve the calcium carbonate 2. Thus, the calcium carbonate dissolution step was conducted (STEP S3).

Afterward, it was centrifuged (3000 rpm, 10 minutes) and washed with the distilled water. Then, it was displaced by ethanol and dried at 80 degrees Celsius for one night.

In addition, thus obtained product was measured on a recovered amount and observed using a microscope.

Figure 12A:
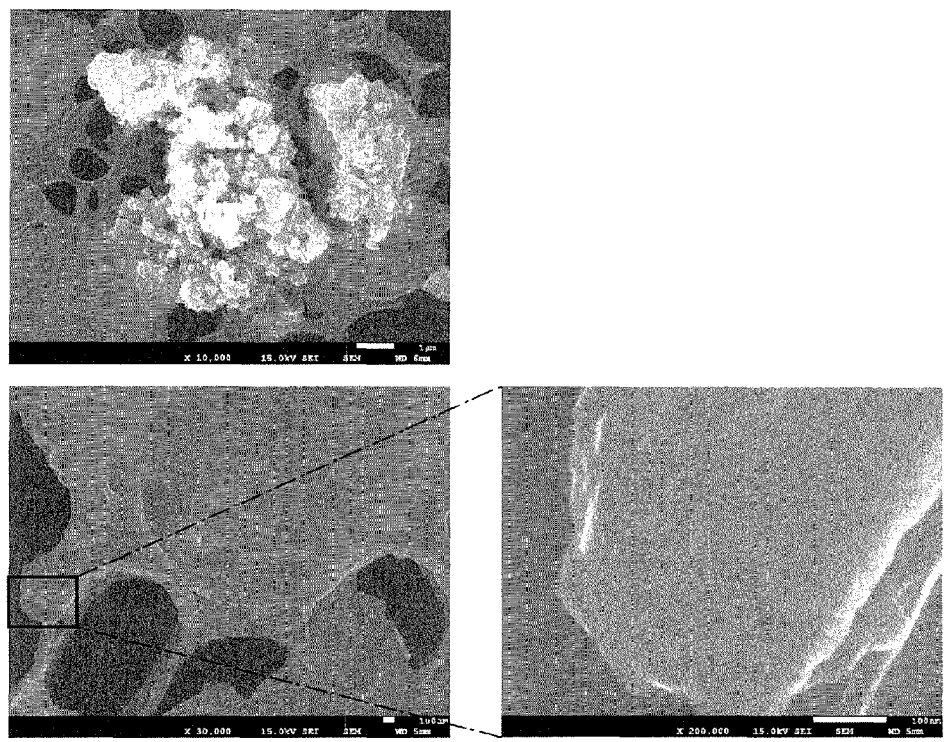
FIG. 12A is a scanning electron microscope (SEM) photograph (SEI: scanning secondary electron image) of Comparative Example 3 of a product wherein a reaction time of a silica formation step is set at 15 minutes.
Figure 12B:
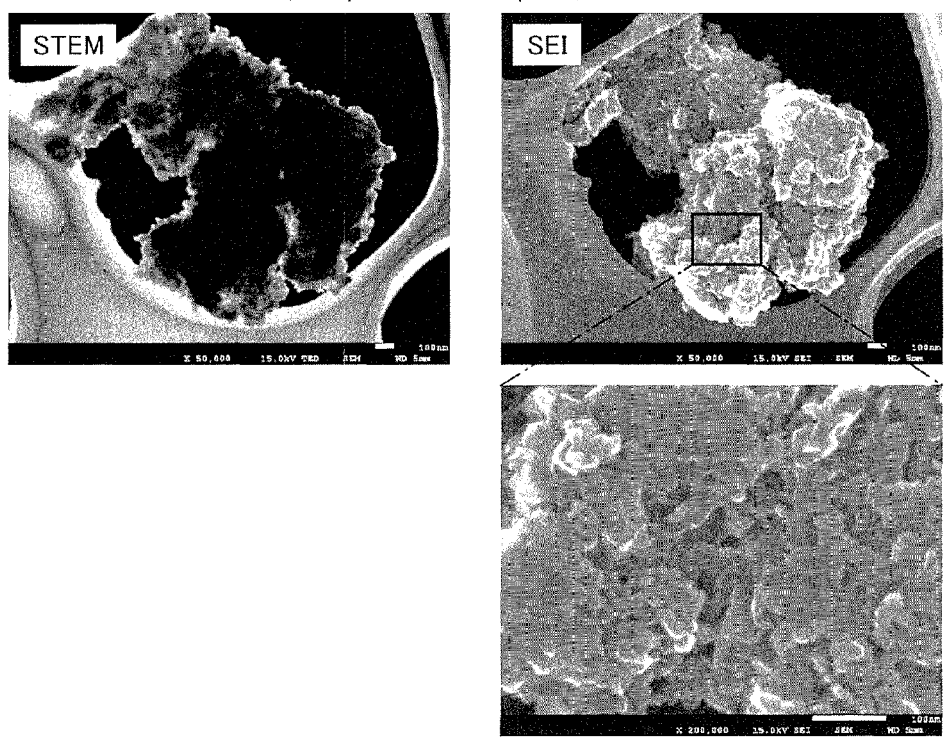
FIG. 12B is a scanning electron microscope (SEM) photograph (SEI: scanning secondary electron image and STEM: scanning transmission electron image) of Comparative Example 4 of a product wherein the reaction time of the silica formation step is set at 30 minutes.
Figure 13C:
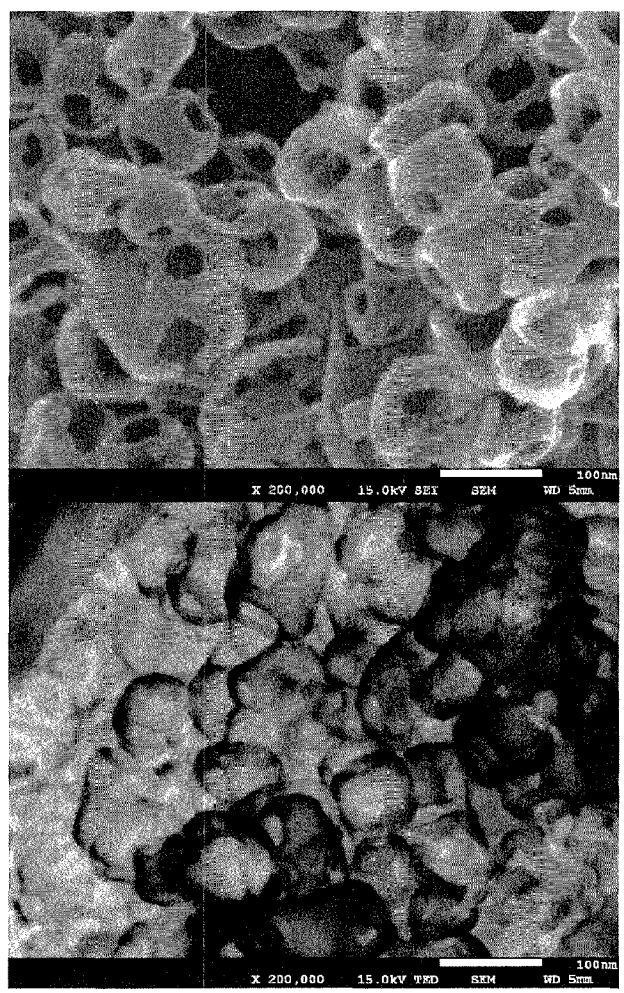
FIG. 13C is a scanning electron microscope (SEM) photograph (SEI: scanning secondary electron image and STEM: scanning transmission electron image) of Example 8 of a product wherein the reaction time of the silica formation step is set at 60 minutes.
Figure 13D:
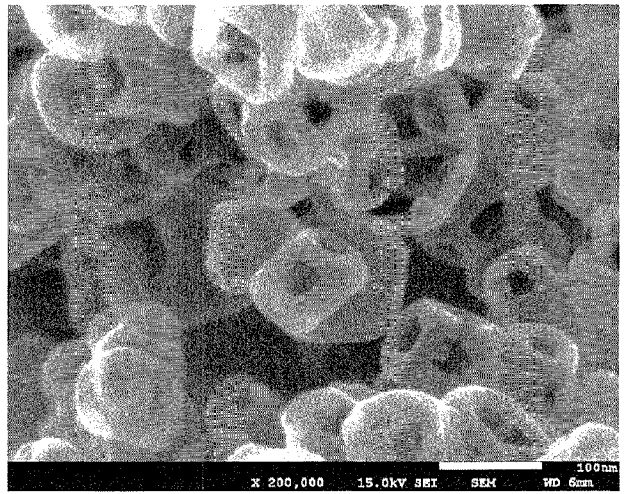
FIG. 13D is a scanning electron microscope (SEM) photograph (SEI: scanning secondary electron image) of Example 9 of a product wherein the reaction time of the silica formation step is set at 90 minutes.
Figure 15A:
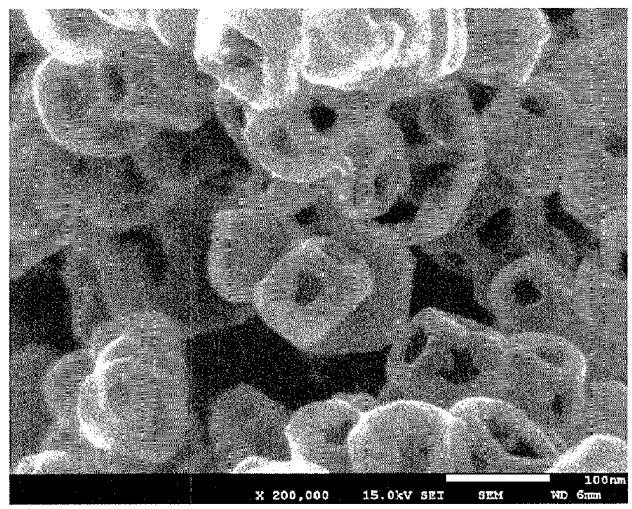
FIG. 15A is a scanning electron microscope (SEM) photograph (SEI: scanning secondary electron image) of Example 12 of a product that uses ethanol as an organic solvent.
Figure 15B:
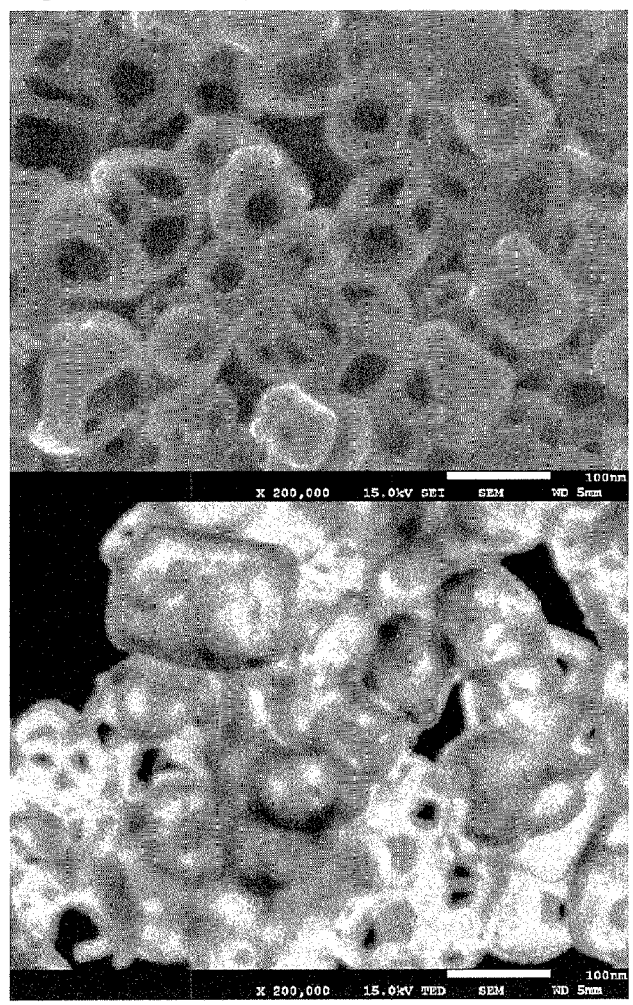
FIG. 15B is a scanning electron microscope (SEM) photograph (SEI: scanning secondary electron image) of Example 13 of a product that uses 1-propanol as the organic solvent.
Figure 19:
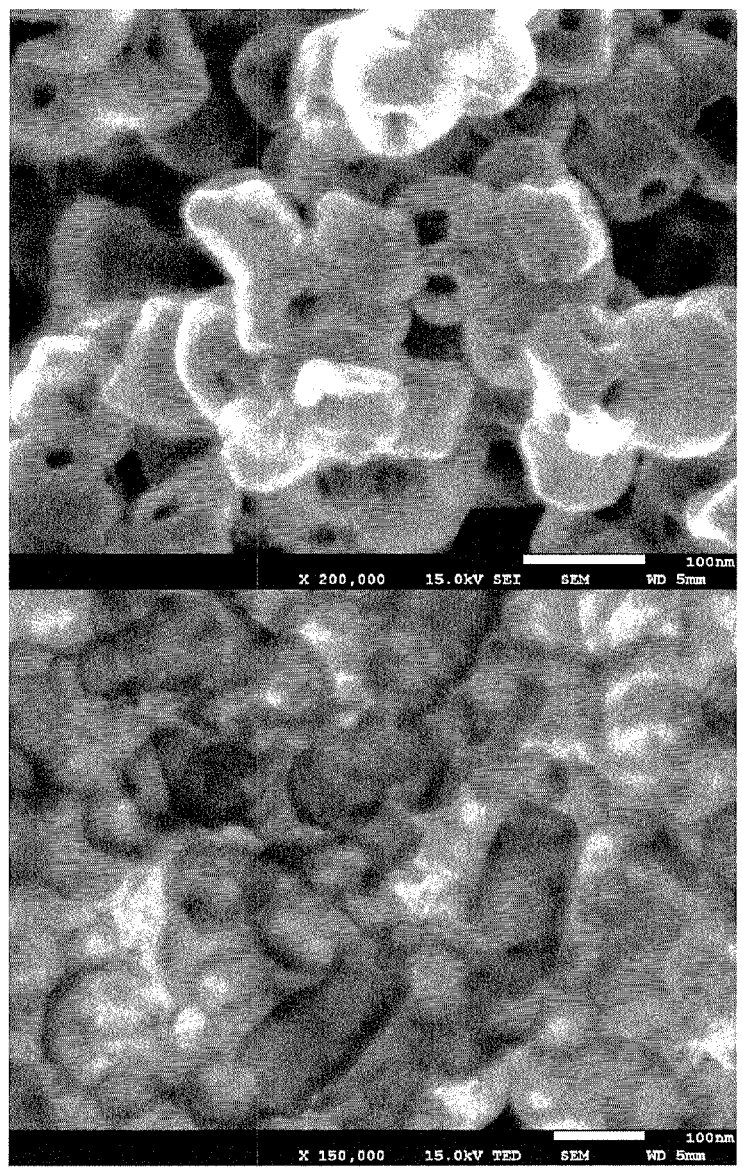
FIG. 19 is a scanning electron microscope (SEM) photograph (SEI: scanning secondary electron image and STEM: scanning transmission electron image) of Example 17 of a product that uses dioxane as the organic solvent.

Blending contents of the above-described Example 8 to the Example 11, the Comparative Example 3, and the Comparative Example 4 are collectively shown in TABLE 2. In addition, the results of the manufacturing tests of the Example 8 to the Example 11, the Comparative Example 3 and the Comparative Example 4 conducted in respective reaction times thereof are collectively shown in TABLE 3, and micrographs of the obtained products are shown in FIG. 12 to FIG. 14.

TABLE 2

| blending content (product name) | | blending amount (g) |
|---|---|---|
| silica formation step | rosin acid-coated calcium carbonate (Homocal D) | 2.50 g |
| | ethanol | 39.96 ml (31.53 g) |
| | TEOS (KBE-04) | 1.61 ml (1.50 g) |
| | water | 8.43 ml (g) |
| | 28% of ammonia | 0.86 g |
| | TOTAL (ethanol + TEOS + water) | 50.00 ml |
| calcium carbonate dissolution step | water | 188.40 ml (g) |
| | hydrochloric acid | 4.71 ml |
| TEOS/rosin acid-coated calcium carbonate | | 0.6 (%) |
| hydrochloric acid/rosin acid-coated calcium carbonate | | 1.88 (%) |

TABLE 3

| | | Comparative Example 3 | Comparative Example 4 | Example 8 |
|---|---|---|---|---|
| reaction time of silica formation step | | 15 min. | 30 min. | 60 min. |
| product | particles | No production of particles (FIG. 12A) | No production of particles (FIG. 12B) | skeleton nanoparticles (FIG. 13C) |
| | recovered amount (unfired) (g) | cannot measure | cannot measure | 0.11 |
| | recovery percentage (TEOS ratio) (%) *1 | — | — | 25.90 |

| | | Example 9 | Example 10 | Example 11 |
|---|---|---|---|---|
| reaction time of silica formation step | | 90 min. | 120 min. | 240 min. |
| product | particles | skeleton nanoparticles (FIG. 13D) | skeleton nanoparticles (FIG. 14E) | skeleton nanoparticles (FIG. 14F) |
| | recovered amount (unfired) (g) | 0.27 | 0.30 | 0.35 |
| | recovery percentage (TEOS ratio) (%) *1 | 62.51 | 69.07 | 81.99 |

*1 recovery percentage (TEOS ratio) (%) = recovered amount (g)/{amount of TEOS (g) × molecular weight Mw of SiO2 = 60.10 (g/mol)/molecular weight Mw of TEOS = 208.37 (g/mol)} × 100

As shown in TABLE 3 and FIG. 12 to FIG. 14, in the Comparative Example 3 and the Comparative Example 4, when the reaction time of the silica formation step was 30 minutes or less, there were not produced the skeleton nanoparticles that have the shape of the cubic frame. On the other hand, in the Example 8 to the Example 11, when the reaction time was set at 60 minutes or more, there were provided skeleton nanoparticles 1 that have the shape of the cubic frame. In addition, a comparison between the Example 8 and Example 9 to Example 12 shows that when the reaction time was set at 90 minutes or more in the silica formation step, the recovery percentage of the skeleton nanoparticles 1 significantly increased.

In addition, microphotographs of the Example 8 to the Example 12 of the skeleton nanoparticles 1 shown in FIG. 13 to FIG. 14 show that there was no change in the particle form of the skeleton nanoparticles 1 depending on the reaction time, more specifically the width W of the silica frame or the size (aperture diameter A) of the pores 1b surrounded by the silica frames or the like.

Thus, it was confirmed that the reaction time in the silica formation step did not affect the particle form of the skeleton nanoparticles 1 and that it affected the recovery percentage such that when the reaction time was set at 90 minutes or more, the recovery percentage of the skeleton nanoparticles 1 increased. Consequently, the reaction time in the silica formation step is desirably set at 90 minutes or more in order to increase the production efficiency of the skeleton nanoparticles 1.

In the above-described embodiments and the Examples, the ethanol 5 was used as the organic solvent. Still, an examination was conducted on an organic solvent capable of forming the skeleton nanoparticles that have the pores between the silica frames and that have the shape of the cubic frame. The results are described hereafter.

As a result of repeated experiments and research by the present inventors, the present inventors found that the particle form of the silica-forming particles 10 was varied depending on a kind of the organic solvent. Then, the Example 12 to Example 17, Comparative Example 5 and Comparative Example 11 were prepared using various organic solvents to perform a manufacturing test. It was conducted under the same condition as each of the above-described Examples and the Comparative Examples.

More specifically, as the organic acid-coated calcium carbonate particles 4 made by coating the surfaces of the calcium ($CaCO_3$) particles 2 in the dry powder state with the organic acid 3, the rosin acid-coated calcium carbonate particles {product name "Homocal D (in the form of a cube, an average primary particle diameter: 80 nm)" manufactured by Shiraishi Kogyo Kaisha, Ltd.} were used. The rosin acid-coated calcium carbonate particles were dispersed in various organic solvents to be shown hereafter in TABLE 4 using an ultrasonic homogenizer for 5 minutes. Moreover, the tetraethoxysilane (TEOS) {product name "KBE-04" manufactured by Shin-Etsu Chemicals Co. Ltd.} as the silicon alkoxide 6 was further added and dispersed using a shaker (150 rpm, 25 degrees Celsius) for 10 minutes. In addition, 8% of the reagent ammonia ($NH_4OH$) water 8 and the distilled water 7 were added thereto and reacted (sol-gel reaction) in the shaker (150 rpm, 25 degrees Celsius) for 90 minutes. Thus, the silica formation step (STEP S2) was conducted.

Subsequently, after a reaction suspension is centrifuged (3000 rpm, 10 minutes) to remove a supernatant, it was subjected to ethanol wash, newly centrifuged (3000 rpm, 10 minutes), and washed with distilled water. Moreover, after it was further centrifuged (3000 rpm, 10 minutes), 4.71 ml of 3N hydrochloric acid solution and 188.40 ml of the distilled water were added to dissolve the calcium carbonate 2. Thus, the calcium carbonate dissolution step was conducted (STEP S3).

Afterward, it was centrifuged (3000 rpm, 10 minutes) and washed with the distilled water. Then, it was displaced by ethanol and dried at 80 degrees Celsius for one night.

In addition, thus obtained product was observed using a microscope.

Each of blending contents of the above-described Example 12 to the Example 17 and the results of manufacturing tests conducted using respective organic solvents are collectively shown in TABLE 4. In addition, each of blending contents of the Comparative Example 5 and the Comparative Example 11 and the results of manufacturing tests conducted using respective organic solvents are collectively shown in TABLE 5. Moreover, micrographs of obtained products or the like are shown in FIG. 15 to FIG. 21.

TABLE 4

|  |  |  | Example 12 | Example 13 | Example 14 |
|---|---|---|---|---|---|
| employed material | silica formation step | organic solvent | alcohol series ethanol (polarity: 24.55) 39.82 ml (31.53 g) | alcohol series 1-porpanol (polarity: 20.45) 38.77 ml (31.22 g) | alcohol series 2-propanol 39.66 ml (31.21 g) |
|  |  | rosin acid-coated calcium carbonate (product name: Homocal D) | 2.50 g | 2.50 g | 2.50 g |
|  |  | TEOS (product name: KBE-04) | 1.61 ml (1.50 g) | 1.61 ml (1.50 g) | 1.61 ml (1.50 g) |
|  |  | water | 8.43 ml (g) | 8.43 ml (g) | 8.43 ml (g) |
|  |  | 28% of ammonia | 0.86 g | 0.89 g | 0.86 g |
|  |  | water/TEOS | 5.62 | 5.62 | 5.62 |
|  |  | TEOS/rosin acid-coated calcium carbonate | 0.60 | 0.60 | 0.60 |
|  |  | TOTAL (ethanol + TEOS + water) | 50.00 ml | 48.81 ml | 50.00 ml |
|  | calcium carbonate dissolution step | water | 180.00 ml (g) | 180.00 ml (g) | 180.00 ml (g) |
|  |  | hydrochloric acid | 4.50 ml | 4.83 ml | 4.50 ml |
|  |  | hydrochloric acid/rosin acid-coated calcium carbonate | 1.80% | 1.93% | 1.80% |
| product |  | production of skeleton nanoparticles that have cavity inside thereof and that have shape of cubic frame | Yes (FIG. 15A) pore size: 9% to 19% (FIG. 21) | Yes (FIG. 15B) pore size: 27% to 56% (FIG. 21) | Yes (FIG. 16C) |
|  |  | recovered amount (unfired) (g) | 0.27 | 0.31 | 0.14 |
|  |  | recovery percentage (TEOS ratio) (%) *1 | 62.51 | 72.17 | 32.18 |
|  |  |  | Example 15 | Example 16 | Example 17 |
| employed material | silica formation step | organic solvent | alcohol series 1-butanol (polarity: 17.51) 39.94 ml (32.35 g) | ketone series methyl ethyl ketone 31.18 g | ethel series dioxane 41.27 g |
|  |  | rosin acid-coated calcium carbonate (product name: Homocal D) | 2.50 g | 2.50 g | 2.50 g |
|  |  | TEOS (product name: KBE-04) | 1.61 ml (1.50 g) | 1.61 ml (1.50 g) | 1.61 ml (1.50 g) |
|  |  | water | 8.43 ml (g) | 8.43 ml (g) | 8.43 ml (g) |
|  |  | 28% of ammonia | 1.02 g | 0.98 g | 0.86 g |
|  |  | water/TEOS | 5.62 | 5.62 | 5.62 |
|  |  | TEOS/rosin acid-coated calcium carbonate | 0.60 | 0.60 | 1.20 |
|  |  | TOTAL (ethanol + TEOS + water) | 49.98 ml |  |  |
|  | calcium carbonate dissolution step | water | 180.00 ml (g) | 180.00 ml (g) | 180.00 ml (g) |
|  |  | hydrochloric acid | 4.60 ml | 4.71 ml | 4.73 ml |
|  |  | hydrochloric acid/rosin acid-coated calcium carbonate | 1.84% | 1.89% | 1.89% |
| product |  | production of skeleton nanoparticles that have cavity inside thereof and that have shape of cubic frame | Yes (FIG. 16D) pore size: 9% to 41% (FIG. 21) | Yes (FIG. 18A) | Yes (FIG. 19) |
|  |  | recovered amount (unfired) (g) | 0.35 |  |  |
|  |  | recovery percentage (TEOS ratio) (%) *1 | 80.67 |  |  |

*1 recovery percentage (TEOS ratio) (%) = receved amount (g)/{amount of TEOS (g) × molecular weight Mw of SiO2 = 60.10 (g/mol)/molecular weight Mw of TEOS = 208.37 (g/mol)} × 100

TABLE 5

| | | | Comaprative Example 5 | Comaprative Example 6 | Comaprative Example 7 | Comaprative Example 8 |
|---|---|---|---|---|---|---|
| employed material | silica formation step | organic solvent | alcohol series methanol 39.82 ml (31.53 g) | alcohol series 1-octanol 39.95 ml (33.16 g) | ketone series acetone 31.18 g | ethere series diethyl ether 28.52 g |
| | | rosin acid-coated calcium carbonate (product name: Homocal D) | 2.50 g | 2.50 g | 2.50 g | 2.50 g |
| | | TEOS (product name: KBE-04) | 1.61 ml (1.50 g) | 1.61 ml (1.50 g) | 1.61 ml (1.50 g) | 1.61 ml (1.50 g) |
| | | water | 8.43 ml (g) | 8.43 ml (g) | 8.41 ml (g) | 8.43 ml (g) |
| | | 28% of ammonia | 0.88 g | 0.86 g | 0.86 g | 0.85 g |
| | | water/TEOS | 5.62 | 5.62 | 5.22 | 5.62 |
| | | TEOS/rosin acid-coated calcium carbonate | 0.60 | 0.60 | 0.60 | 1.20 |
| | | TOTAL (ethanl + TEOS + water) | 49.86 ml | 49.99 ml | | |
| | calcium carbonate dissolution step | water | 180.00 ml (g) | 180.00 ml (g) | 180.00 ml (g) | 180.00 ml (g) |
| | | hydrochloric acid | 4.71 ml | 4.50 ml | 4.49 ml | 4.74 ml |
| | | hydrochloric acid/rosin acid-coated calcium carbonate | 1.88% | 1.80% | 1.80% | 1.90% |
| product | production of skeleton nanoparticles that have cavity inside thereof and that have shape of cubic frame | | No (FIG. 17A) hollow particles surrounded by faces and having shape of cube | No (FIG. 17B) hollow particles surrounded by faces and having shape of cube | No (FIG. 18B) No production of particles (frame-shaped product) | No  No product |
| | recovered amount (unfired) (g) | | 0.30 | 0.04 | | |
| | recovery percentage (TEOS ratio) (%) *1 | | 69.53 | 9.39 | | |

| | | | Comparative Example 9 | Compartive Example 10 | Compartive Example 11 |
|---|---|---|---|---|---|
| employed material | silica formation step | organic solvent | glycol series ethylene glycol 44.53 g | glycol series diethylene glycol 44.51 g | polar aprotic series N,N-diethyl formaldehyde (DMF) 31.18 g |
| | | rosin acid-coated calcium carbonate (product name: Homocal D) | 2.50 g | 2.50 g | 2.50 g |
| | | TEOS (product name: KBE-04) | 1.61 ml (1.50 g) | 1.61 ml (1.50 g) | 1.61 ml (1.50 g) |
| | | water | 8.43 ml (g) | 8.43 ml (g) | 8.43 ml (g) |
| | | 28% of ammonia | 0.85 g | 0.86 g | 0.85 g |
| | | water/TEOS | 5.62 | 5.62 | 5.62 |
| | | TEOS/rosin acid-coated calcium carbonate | 0.60 | 0.60 | 0.60 |
| | | TOTAL (ethanol + TEOS + water) | | | |
| | calcium carbonate dissolution step | water | 180.00 ml (g) | 180.00 ml (g) | 180.00 ml (g) |
| | | hydrochloric acid | 4.52 ml | 4.47 ml | 4.50 ml |
| | | hydrochloric acid/rosin acid-coated calcium carbonate | 1.81% | 1.80% | 1.80% |
| product | production of skeleton nanoparticles that have cavity inside thereof and that have shape of cubic frame | | No  No product | No (FIG. 20) No production of particles | No  No product |
| | recovered amount (unfired) (g) | | | | |
| | recovery percentage (TEOS ratio) (%) *1 | | | | |

*1 recovery percentage (TEOS ratio) (%) = recoved amount (g)/{amount of TEOS (g) × molecular weight Mw of SiO2 = 60.10 (g/mol)/molecular weight Mw of TEOS = 208.37 (g/mol)} × 100

As shown in TABLE 4, FIG. 15, FIG. 16, FIG. 18, and FIG. 19, in the Example 12 to the Example 17, it was proved that when an alcohol series such as ethanol, 1-propanol, 2-propanol, and 1-buthanol, a ketone series of methyl ethyl ketone, or an ether series of dioxane that has high solubility in water was used as the organic solvent, it was possible to form skeleton nanoparticles 1 that had pores between silica frames and that had a shape of a cubic frame.

By contrast, as shown in TABLE 5 and FIG. 17, in the Comparative Example 5 and the Comparative Example 6, when methanol or 1-octanol was used, though they were the same alcohol series, the particle form of the silica shell did not become the shape of the cubic frame, but there were produced hollow particles surrounded by faces of the silica shell and having the form of a cube. In addition, as shown in TABLE 5 or FIG. 20, in the Comparative Example 7 to the Comparative Example 11, it was confirmed that it was not possible to form the skeleton nanoparticles 1 that had the pores between the silica frames and that had the shape of the cubic frame when used a ketone series of acetone, an ethylene glycol series of glycol or diethylene glycol, an ether series of diethyl ether that had low solubility in the water, or a polar aprotic series of N,N-dimethyl formaldehyde (DMF).

Moreover, as shown in FIG. 21, a comparison of the Example 12, the Example 13 and the Example 15 shows that the produced skeleton nanoparticles 1 had a difference in a proportion (%) of the pores though using the same alcohol series. In particular, the Example 13 of the skeleton nanoparticles 1 formed by using the 1-propanol had a large pore 1b and a particle form of a thin frame as compared with the Example 12 of the skeleton nanoparticles 1 using the ethanol or with the Example 15 of the skeleton nanoparticles 1 using the 1-butanol. That is, it was confirmed that the particle form of the skeleton nanoparticles 1 varied depending on the kind of the organic solvent. Consequently, it is possible to control the particle form such as the width W of the silica frame and the size (aperture diameter A) of the pore 1b surrounded by the silica frames by the kind of the organic solvent, too.

Based on these facts, it is estimated that a polarity of the organic solvent or the like is connected to interactivity (affinity and reactivity) with the organic acid-coated calcium carbonate and the TEOS in forming the skeleton nanoparticles 1 that have the shape of the cubic frame.

In addition, in the Example 12 to the Example 17 wherein the alcohol series such as ethanol, 1-propano, and 1-butanol, the ketone series such as methyl ethyl ketone, and the ether series such as dioxane were thus used as the organic solvent, a part of the organic acid 3 is surely dissolved by such organic solvent. However, the organic solvent has low solubility to the organic acid 3 and has weak interactivity (affinity and reactivity) with the calcium carbonate particles 2 or the silicon alkoxide 6. Thus, it is estimated that the silica shell 1a produced by hydrolysis of the silicon alkoxide 6 is easily absorbed on the edge portion, which came out by dissolving the organic acid 3, of the calcium carbonate 2, thereby forming the skeleton nanoparticles 1 that have the pores between the silica frames and that have the shape of the cubic frame.

On the other hand, in the Comparative Example 5 and the Comparative Example 6 using the methanol and the 1-octanol as the organic solvent, the organic solvent has high solubility to the organic acid 3 and has strong interactivity (affinity and reactivity) with the calcium carbonate particles 2 or the silicon alkoxide 6. Thus, a large portion of the surface of the organic acid-coated calcium carbonate particle 2 is covered by the organic solvent by interaction of the surface, which came out by dissolving the organic acid 3, of the calcium carbonate particle 2 and the organic solvent. In addition, hydrolysis of the silicon alkoxide is facilitated by interaction of the organic solvent and the silicone alkoxide. Thus, it is estimated that the silica shell 1a, which was produced by hydrolysis of the silicon alkoxide 6, was facilitated to be formed on the entire surfaces of the calcium carbonate particles 2 by forming a complex of the calcium carbonate and the organic solvent or a complex of the organic solvent and the silicon alkoxide, thereby forming the hollow particles surrounded by the faces of the silica shell and having the form of the cube.

Thus, in the practice of the present invention, as the organic solvent, an alcohol series such as propanol and butanol, a ketone series such as methyl ethyl ketone, or an ether series such as dioxane may be used in addition to the ethanol 5. In particular, the alcohol series solvent, the ketone series solvent, and the ether series solvent can form the silica shell 1a on only the edge portion of the calcium carbonate even in a short reaction time of the silica forming step as shown in the above-described Example 12 to Example 17. Thus, they have high reaction efficiency and can improve the production efficiency. In addition, each of the alcohol series solvent, the ketone series solvent and the ether series solvent is easily available, easily handled, and relatively cheap. Accordingly, they can achieve cost reduction, too.

As compared with the hollow particles surrounded by the faces of the silica shell and having the form of the cube, the skeleton nanoparticles 1 with the shape of the cubic frame have higher transparency or light permeability and also having higher light diffusivity and light scattering capability by refracting and scattering the incident light at the silica frame with a high frequency, since they have the pores 1b between the silica frames. Thus, for example, when the skeleton nanoparticles 1 are used in lighting equipment such as an LED light, they are expected to further improve the luminous efficiency as compared with the case of using the hollow particles surrounded by the faces of the silica shell and having the form of the cube.

In the above-described embodiments, the modified silicon oil 9 is mixed in order to protect the surface of the silica shell 1a to improve the production efficiency or the diffusivity. However, as a result of extensive experiments and research by the present inventors, the following facts were confirmed. That is, the recovery percentage of the skeleton nanoparticles 1 increases, while a low particle size distribution being obtained therefor, by using the amino-modified silicon oil (one that has a structure in which a part of a methyl group of a silicon oil is displaced by an aminoalkyl group) as the silicon oil for protecting the surface of the silica shell 1a.

More specifically, according to the experiments and the research by the present inventors, the following facts were confirmed. That is, the amino-modified silicon oil has a high reactivity with the surface (silica shell 1a) of the silica-forming particles 10. Then, only intended silica-forming particles 10 are precipitated and separated by centrifugation without filtering or using a flocculant in a washing treatment after forming the silica-forming particles 10, if the amino-modified silicon oil is used. Thereby, it is possible to easily remove by-products such as solid silica particles other than the intended silica-forming particles 10 produced by the sol-gel method. Moreover, only intended skeleton nanoparticles 1 are also precipitated and separated by centrifugation without filtering or using a flocculant even in a washing treatment after dissolving the calcium carbonate 2. Thereby, it is possible to easily remove calcium chloride (residual calcium salt) or the like produced in dissolving the calcium carbonate 2 by the acid treatment. Then, only the skeleton nanoparticles 1 are efficiently collected. Thus, it is possible to obtain the skeleton nanoparticles 1 at a high recovery percentage.

In addition, the amino-modified silicon oil has the high reactivity with the surface (silica shell 1a) of the silica-forming particles 10, and the surface of the silica shell 1a of the silica-forming particles 10 is highly protected by the amino-modified silicon oil. Thus, the aggregation of the silica-forming particles 10 is prevented, and the skeleton nanoparticles 1 obtained by dissolving the calcium carbonate 2 in the silica-forming particles 10 are also prevented from aggregating. Thus, there are provided skeleton nanoparticles that have a low particle size distribution and a high dispersibility.

Moreover, it is possible to protect the surface of the silica shell 1a of the silica-forming particles 10 by mixing the amino-modified silicon oil at the same time as a reaction (sol-gel reaction) for forming the silica shell 1a in the silica formation step. Thus, manufacturing efficiency is high, too.

Thus, the amino-modified silicon oil is preferable as the silicon oil. A side-chain type monoamine-modified silicon oil is more preferable.

In the practice of the present invention, as the dry powdered calcium carbonate particles 2, commercially available calcium carbonate particles, for example, synthetic calcium carbonate manufactured by Shiraishi Kogyo Kaisha Ltd. {product name "Brilliant (a primary particle diameter: 150 nm)"} or the like may be purchased. Then, they may be coated with the organic acid 3 such as a rosin acid to form the dry powdered calcium carbonate particles 4, too. However, as the organic acid-coated calcium carbonate particles 4, commercially available organic acid-coated calcium carbonate powder may be used, too. Such commercially available organic acid-coated calcium carbonate powder includes, for example, rosin acid-coated calcium carbonate particles manufactured by Shiraishi Kogyo Kaisha Ltd. (product name "Homocal D (a primary particle diameter: 80 nm)", "Hakuenka DD (a primary particle diameter: 50 nm)", "Hakuenka O (a primary particle diameter: 30 nm)" or the like.

In addition, the dry powdered organic acid-coated calcium carbonate particles 4 preferably have a size such that an outer diameter measured by a microscopic method is within a range of 26 nm to 280 nm. Thus, an outer diameter of finally obtained skeleton nanoparticles 1, which is measured by the microscopic method, can be set within a range of 30 nm to 300 nm.

As described above, the present invention uses the dry powdered organic acid-coated calcium carbonate particles 4 made by coating the surfaces of the calcium carbonate particles 2 in the dry powder state with the organic acid 3. Thus, the raw materials have less property change and are stable for a long period of time. Thereby, the quality control is inexpensive. In particular, the rosin acid-coated calcium carbonate as the organic acid-coated calcium carbonate particles 4 is available at a cheap price. Moreover, the organic solvent of the alcohol series, the ketone series, the ether series or the like is stable for a long period of time, too. Thus, its quality control is inexpensive and it is available at a low cost.

Consequently, the raw materials are cheap and the manufacturing cost is low. Thus, it is possible to manufacture them at a low cost. Moreover, it is possible to improve the production efficiency, since the property change of the raw materials less occurs.

In the practice of the present invention, the present invention is not limited to each of the above-described embodiments and each of the Examples with respect to a blending amount and a blending ratio of each of components, reaction time, a reaction temperature or the like in the method for manufacturing the skeleton nanoparticles and other steps of the method for manufacturing the skeleton nanoparticles.

In addition, the numeric values described in the present embodiment of the invention do not indicate a critical value and indicate an appropriate value which is suitable for the embodiment. Even if the above numeric values may be changed slightly, the present invention can be practiced as well.

The invention claimed is:

1. A skeleton nanoparticle comprising:
   a silica shell having an outer diameter ranging from 30 nm to 300 nm,
   wherein the silica shell has a shape of a cuboid skeleton frame having six faces as a whole such that the silica shell is hollow at an inside thereof and such that each of the six faces of the cuboid skeleton frame defines a quadrilateral skeleton silica frame, while forming an aperture at an inside of the quadrilateral skeleton silica frame.

2. A skeleton nanoparticle according to claim 1, in which the aperture has an aperture ratio within a range of 3% to 94% in relation to a surface area of each of the six faces of the cuboid skeleton frame.

3. A skeleton nanoparticle according to claim 1, in which the quadrilateral skeleton silica frame has a frame width within a range of 5 nm to 115 nm.

4. A skeleton nanoparticle according to claim 1, in which the aperture has an aperture diameter ranging from 5 nm to 290 nm.

5. A skeleton nanoparticle according to claim 1, in which the aperture has an aperture ratio within a range of 10% to 87% in relation to a surface area of each of the six faces of the cuboid skeleton frame.

6. A skeleton nanoparticle according to claim 1, in which the quadrilateral skeleton silica frame has a frame width within a range of 10 nm to 100 nm.

7. A skeleton nanoparticle according to claim 1, in which the aperture has an aperture diameter ranging from 10 nm to 280 nm.

8. A method for manufacturing skeleton nanoparticles each comprising a silica shell having an outer diameter ranging from 30 nm to 300 nm and having a shape of a cuboid skeleton frame, wherein the cuboid skeleton frame is hollow at an inside thereof and each of six faces of the cuboid skeleton frame defines a quadrilateral skeleton silica frame, while forming an aperture at an inside of the quadrilateral skeleton silica frame,
   the method for manufacturing the skeleton nanoparticles comprising:
   coating an organic acid on surfaces of calcium carbonate particles each having a predetermined outer diameter and each being in a form of a cuboid and in a dry powder state to form dry powdered organic acid-coated calcium carbonate particles;
   dispersing the organic acid-coated calcium carbonate particles in an organic solvent to dissolve an organic acid coating at edge portions of the organic acid-coated calcium carbonate particles, and further to mix a silicon alkoxide and a base catalyst in the organic solvent to form silica-forming particles by forming the silica shell along uncoated edge portions of the organic acid coated calcium carbonate particles, wherein the dispersing is performed for a reaction time not less than 60 minutes; and
   dissolving the organic acid-coated calcium carbonate at an inside of the silica-forming particles by an acid treatment.

9. A method for manufacturing skeleton nanoparticles according to claim 8, in which the dispersing is conducted such that the aperture has an aperture ration within a range of 3% to 94% in relation to a surface area of each of the six faces of the cuboid skeleton frame.

10. A method for manufacturing skeleton nanoparticles according to claim 8, in which the dispersing is conducted such that the quadrilateral skeleton silica frame has a frame width within a range of 5 nm to 115 nm.

11. A method for manufacturing skeleton nanoparticles according to claim 8, in which that the organic acid is a rosin acid.

12. A method for manufacturing skeleton nanoparticles according to claim 8, in which the organic solvent is at least one kind selected from a group consisting of an alcohol series, a ketone series and an ether series.

13. A method for manufacturing skeleton nanoparticles according to claim 8, in which a silicon oil is further mixed in the organic solvent in the dispersing.

14. A method for manufacturing skeleton nanoparticles according to claim 8, in which an ultrasonic treatment was conducted on the surfaces of the organic acid-coated calcium carbonate particles in the dispersing.

* * * * *